United States Patent
Ishida et al.

(10) Patent No.: US 12,517,506 B2
(45) Date of Patent: Jan. 6, 2026

(54) ROAD SHOULDER EVACUATION RUNNING ASSISTANCE SYSTEM

(71) Applicant: DENSO CORPORATION, Kariya (JP)

(72) Inventors: Syoya Ishida, Nisshin (JP); Shunya Kumano, Nisshin (JP); Tetsuya Takafuji, Kariya (JP); Masaya Okada, Nisshin (JP); Naoya Inoue, Kariya (JP)

(73) Assignee: DENSO CORPORATION, Kariya (JP)

( * ) Notice: Subject to any disclaimer, the term of this patent is extended or adjusted under 35 U.S.C. 154(b) by 275 days.

(21) Appl. No.: 17/809,108

(22) Filed: Jun. 27, 2022

(65) Prior Publication Data

US 2022/0413486 A1 Dec. 29, 2022

(30) Foreign Application Priority Data

Jun. 29, 2021 (JP) ................................. 2021-107926

(51) Int. Cl.
*G05D 1/00* (2024.01)
*B60W 40/04* (2006.01)
(Continued)

(52) U.S. Cl.
CPC ........... *G05D 1/0011* (2013.01); *B60W 40/04* (2013.01); *B60W 50/0098* (2013.01);
(Continued)

(58) Field of Classification Search
CPC .. G05D 1/0011; G05D 1/0055; G05D 1/0282; B60W 40/04; B60W 50/0098; B60W 2050/0083; B60W 2554/406; B60W 2555/60; B60W 2556/10; B60W 2556/40; B60W 2556/45; B60W 30/18163; H04W 4/40

See application file for complete search history.

(56) References Cited

U.S. PATENT DOCUMENTS 9,205,816 B2 * 12/2015 Kobana ................... B60K 28/06
9,523,984 B1 * 12/2016 Herbach ................ B60W 10/18
(Continued)

FOREIGN PATENT DOCUMENTS

JP 2005025528 A * 1/2005
JP 2007-331652 A 12/2007
(Continued)

*Primary Examiner* — Jess Whittington
(74) *Attorney, Agent, or Firm* — Maschoff Brennan

(57) ABSTRACT

An evacuation running assistance system includes a road shoulder evacuation possibility determiner to determine if an own vehicle can be evacuated to a road shoulder; an own vehicle situation determiner to determine a current situation of an own vehicle in accordance with a time limit and the road shoulder evacuation possibility, a controller to control an own vehicle in accordance with the situation of the own vehicle; and a road shoulder evacuation possibility road determiner to acquire evacuation space information from a past running history of the own vehicle. The own vehicle situation determiner determines that the own vehicle is in the situation to be controlled to perform the on-lane stopping when the road shoulder evacuation possibility road determiner does not determine within the provisional time that the evacuation of the own vehicle to the road shoulder is possible.

14 Claims, 14 Drawing Sheets

(51) Int. Cl.
*B60W 50/00* (2006.01)
*H04W 4/40* (2018.01)

(52) U.S. Cl.
CPC ......... *G05D 1/0055* (2013.01); *G05D 1/0282* (2013.01); *H04W 4/40* (2018.02); *B60W 2050/0083* (2013.01); *B60W 2554/406* (2020.02); *B60W 2555/60* (2020.02); *B60W 2556/10* (2020.02); *B60W 2556/40* (2020.02); *B60W 2556/45* (2020.02)

(56) References Cited

U.S. PATENT DOCUMENTS

| | | |
|---|---|---|
| 2015/0345961 A1 | 12/2015 | Oooka et al. |
| 2015/0345964 A1 | 12/2015 | Oooka et al. |
| 2016/0137198 A1 | 5/2016 | Hauler et al. |
| 2017/0297567 A1 | 10/2017 | Matsumura |
| 2018/0229736 A1* | 8/2018 | Narita ................. H04W 4/44 |
| 2019/0135281 A1* | 5/2019 | Miura ............ B60W 30/18163 |
| 2019/0212725 A1* | 7/2019 | Woodrow ............ G05D 1/0295 |
| 2020/0070841 A1 | 3/2020 | Sugano et al. |
| 2020/0070842 A1 | 3/2020 | Sugano et al. |
| 2020/0353925 A1* | 11/2020 | Kim ..................... B60W 40/08 |
| 2022/0252409 A1* | 8/2022 | Harrington .......... G01C 21/343 |

FOREIGN PATENT DOCUMENTS

| | | | |
|---|---|---|---|
| JP | 2010-125923 A | 6/2010 | |
| JP | 2014-106854 A | 6/2014 | |
| JP | 6220434 B1 | 10/2017 | |
| JP | 2019174428 A | * 10/2019 | |
| JP | 2020-052791 A | 4/2020 | |
| WO | WO-2020099555 A1 | * 5/2020 | ............ B60W 10/04 |

* cited by examiner

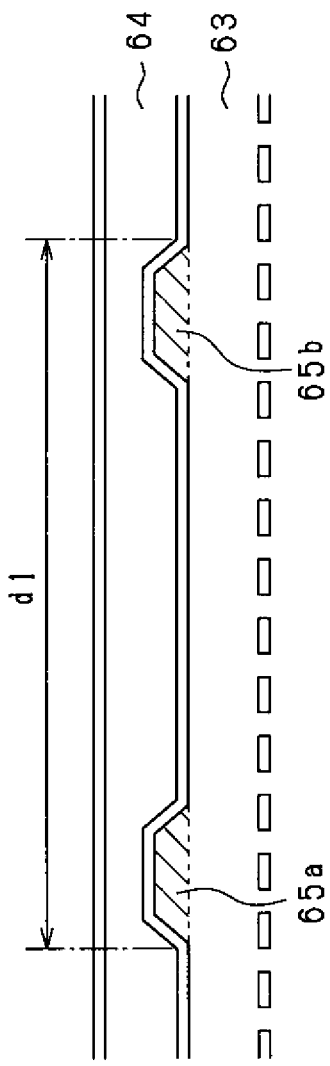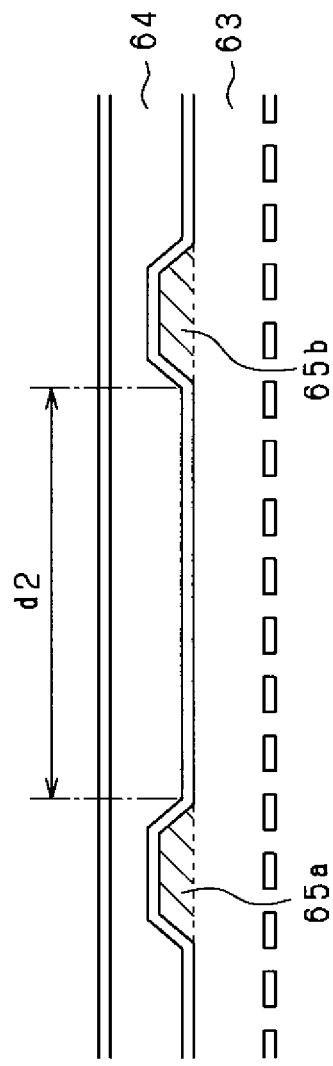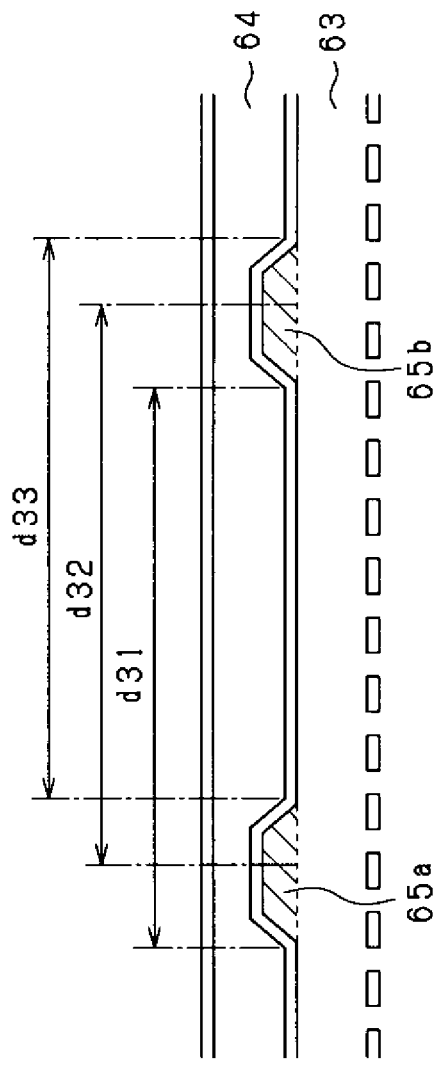

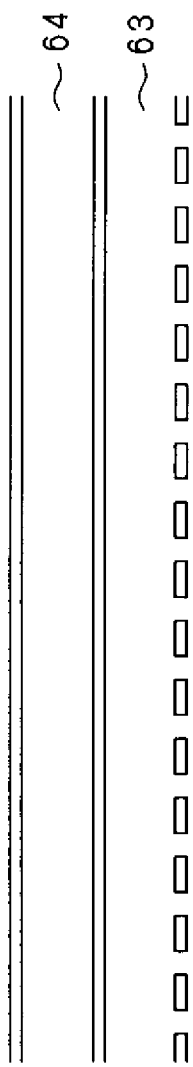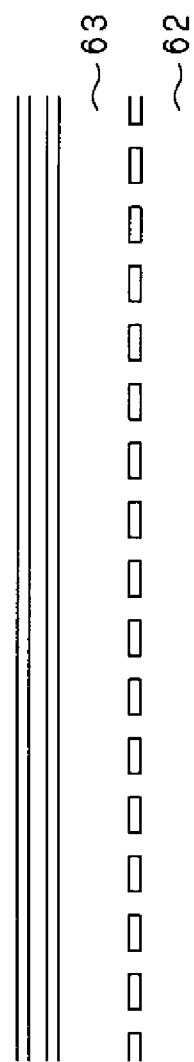

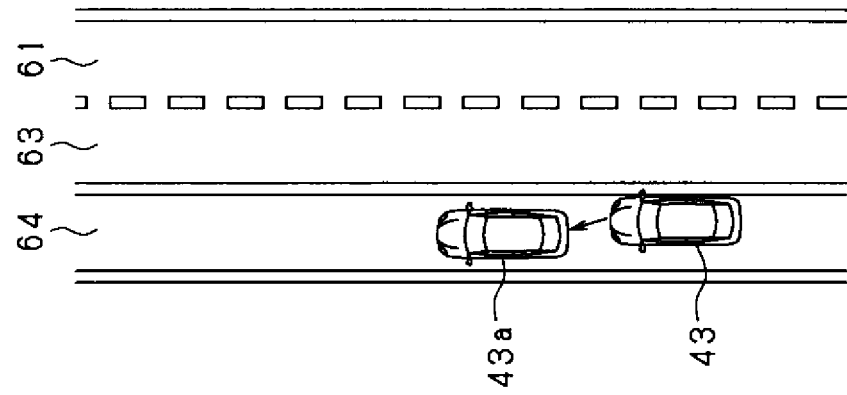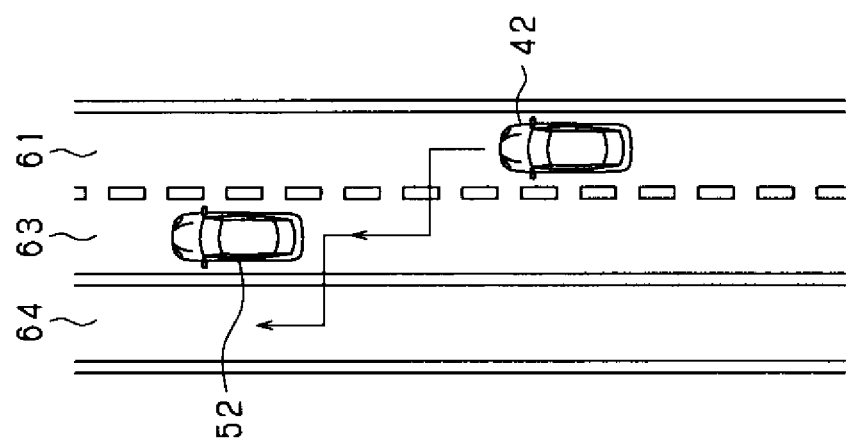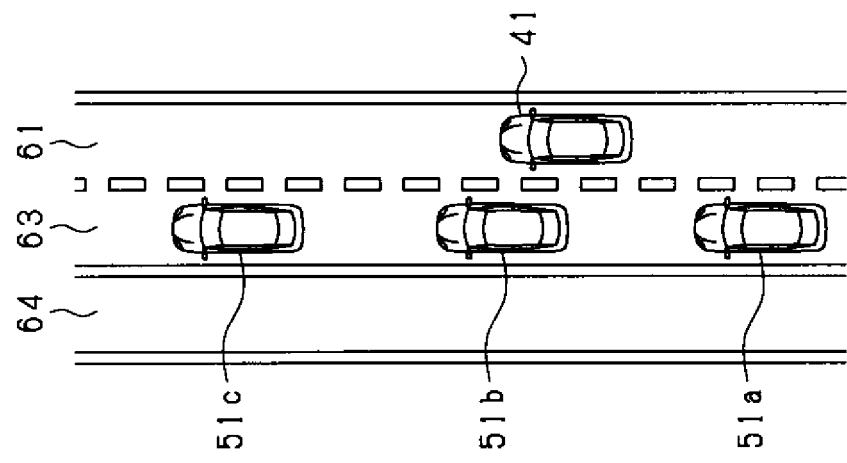

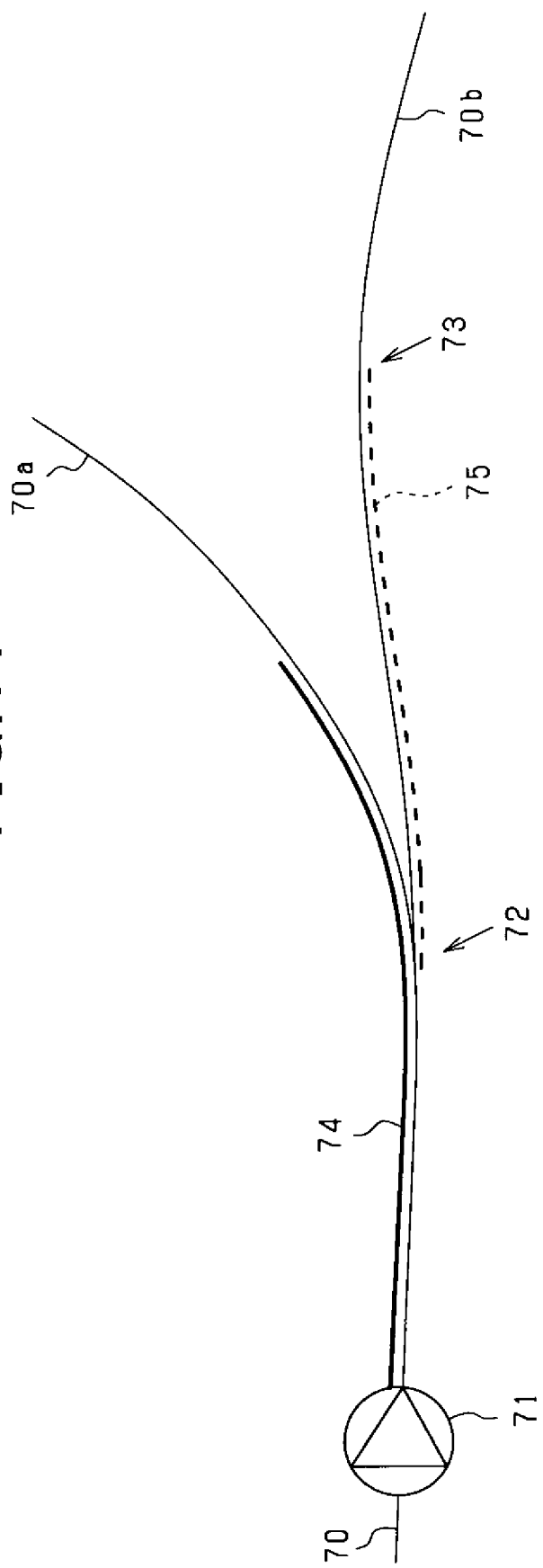

ROAD SHOULDER EVACUATION RUNNING ASSISTANCE SYSTEM

CROSS-REFERENCE TO RELATED APPLICATION

This patent application is based on and claims priority to Japanese Patent Application No. 2021-107926, filed on Jun. 29, 2021 in the Japan Patent office, the entire disclosure of which is hereby incorporated by reference herein.

BACKGROUND

Technical Field

The present disclosure relates to an evacuation running assistance system.

Related Art

An evacuation running assistance system has been proposed, which evacuates a vehicle to an evacuation destination when a driver becomes unable to drive due to lowering of consciousness or the like. A known evacuation running assistance system determines (i.e., estimates) respective risks caused when an own vehicle stops running at future traveling points and when the own vehicle passes therethrough, based on information of each of a map, an own vehicle, and surrounding environment. Subsequently, a point causing a lower risk than a given level is set for an evacuation destination for a vehicle to stop. Further, an evacuation route is established by combining points causing the vehicle to have lower risks when passing therethrough. Subsequently, the evacuation route is combined with the evacuation destination.

However, in the past, when an own vehicle is traveling on a road with few places which provide safe evacuation thereto, such as a highway without a road shoulder, etc., a known evacuation running assistance system provides a lengthy evacuation route thereby prolonging a running time after a driver becomes unable to drive. Hence, when the running time is excessively prolonged, a quick rescue of the driver will be highly likely to be hindered.

In view of this, the present disclosure is made to address and resolve the above-described problem, and it is an object of the present disclosure to provide an evacuation running assistance system capable of avoiding or reducing an unnecessarily prolonged running time caused after the driver becomes unable to drive.

SUMMARY

Accordingly, a first aspect of the present disclosure provides a novel evacuation running assistance system that comprises: a surrounding environment recognizer enabled to recognize at least a space on a road shoulder and existence of one or more vehicles around an own vehicle; an evacuation running time limit setter to set a first given time period for a time limit in which an own vehicle is allowed to continue evacuation running; and a road shoulder evacuation possibility determiner to determine if an own vehicle can be evacuated to a road shoulder in accordance with the space of the road shoulder recognized by the surrounding environment recognizer. The evacuation running assistance system also includes an own vehicle situation determiner to determine a current situation of an own vehicle in accordance with the time limit as set and the road shoulder evacuation possibility as determined. The own vehicle situation determiner determines the current situation by selecting one of situations where evacuation running is to be continued, on-lane stopping is to be performed, and evacuation to a road shoulder is to be performed, respectively. The evacuation running assistance system further includes; a controller to control an own vehicle in accordance with the situation of the own vehicle determined by the own vehicle situation determiner; and a road shoulder evacuation possibility road determiner to acquire evacuation space information from a past running history of the own vehicle. The evacuation space information indicates a space on a road shoulder of a road. The space allows evacuation of the own vehicle that travels along the road. The road shoulder evacuation possibility road determiner determines if the road allows road shoulder evacuation of the own vehicle traveling along the road in accordance with the evacuation space information. The road shoulder evacuation possibility road determiner sets a second given time period for a provisional time shorter than the time limit based on the evacuation space information. The own vehicle situation determiner determines that the own vehicle is in the situation to be controlled to perform the on-lane stopping when the road shoulder evacuation possibility road determiner does not determine within the provisional time that the evacuation of the own vehicle to the road shoulder is possible.

Hence, in the first evacuation running assistance system, the road shoulder evacuation possibility road determiner sets a given time period for a provisional time shorter than the time limit in accordance with the evacuation space information. Further, the own vehicle is determined to be in a state in which the on-lane stopping is to be performed when it is not determined within the provisional time that evacuation of the own vehicle to the road shoulder is possible.

Accordingly, according to the first evacuation drive assistance system, if it is not determined within the provisional time that evacuation of the own vehicle to the road shoulder is possible, it is determined that the own vehicle is in a state (to be controlled) to perform the on-lane stopping, even if the own vehicle situation determiner can determine that the own vehicle is either in a state in which evacuation driving is to be continued or in a state in which the shoulder evacuation is to be performed in accordance with the time limit as set and possibility of road shoulder evacuation as determined. Here, a given time less than the time limit is set by the road shoulder evacuation possibility determiner for the provisional time in accordance with the evacuation space information obtained from the past driving history generated by the own vehicle. For example, when the evacuation space information indicating that there is no evacuation space is acquired from the past driving history, the road shoulder evacuation possibility determiner determines that a road traveled by the own vehicle is a road that cannot allow the own vehicle to be evacuated to the road shoulder and sets a value zero for the provisional time. That is, when the value zero is set for the provisional time, since such a situation represents that it is not determined in the provisional time (period) that evacuation of the own vehicle to the shoulder is possible, the own vehicle situation determiner determines that the own vehicle is in the situation in which on-lane stopping is to be performed. As a result, the own vehicle can be stopped on the lane immediately without waiting for elapsing of the time limit. Hence, according to the first evacuation drive assistance system, a given time period is set for the provisional time period in accordance with the evacuation space information obtained from the past driving history of the own vehicle to be less than the time limit is utilized. Then, if it is not determined within the provisional time that evacuation of the own vehicle to the shoulder is possible, the own vehicle can be controlled to perform on-lane stopping. Hence, a traveling time after a driver becomes unable to drive can be avoided from being unnecessarily prolonged.

A second aspect of the present disclosure provides a novel evacuation running assistance system that comprises: a surrounding environment recognizer enabled to recognize at least a space on a road shoulder and existence of one or more vehicles around an own vehicle; a time limit setter to set a given time period for a time limit allowing an own vehicle to continue evacuation running; and a road shoulder evacuation possibility determiner to determine if an own vehicle can be evacuated to a road shoulder in accordance with the space of the road shoulder recognized by the surrounding environment recognizer. The evacuation running assistance system of the second aspect also includes a situation determiner to determine a current situation of an own vehicle in accordance with the time limit as set and the road shoulder evacuation possibility as determined. The own vehicle situation determiner determines the current situation by selecting one of situations in which evacuation running is to be continued, on-lane stopping is to be performed, and evacuation to a road shoulder is to be performed, respectively. The evacuation running assistance system of the second aspect further includes a controller to control an own vehicle in accordance with the current situation of the own vehicle determined by the own vehicle situation determiner. The own vehicle situation determiner determines before a time limit previously set has elapsed that the own vehicle is in the on-lane stopping situation when it is determined by the surrounding environment recognizer that it is impossible to evacuate to the road shoulder due to a traffic jam.

Hence, in the second evacuation drive assistance system, the own vehicle situation determiner determines before elapse of the time limit as previously set that the own vehicle is in a situation in which on-lane stopping is to be performed when it is determined by the surrounding environment recognizer that evacuation to the shoulder is impossible due to the traffic jam.

According to the second evacuation drive assistance system, when it is determined by the surrounding environment recognizer that shoulder evacuation is impossible due to the traffic jam, It is determined before elapse of the time limit as previously set that the own vehicle is in the situation where on-lane stopping is to be performed, even if the own vehicle situation determiner can determine that the own vehicle is either in a state in which evacuation driving is to be continued or in a state in which the shoulder evacuation is to be performed in accordance with the time limit as set and possibility of evacuation to the road shoulder as determined. According to the second evacuation drive assistance system, when it is determined that the shoulder evacuation is impossible due to the traffic jam, the own vehicle can be controlled before elapse of the time limit to stop the own vehicle on the lane. Hence, a driving time period after a driver becomes unable to drive can be avoided from being unnecessarily prolonged.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIGS. 4A to 4C are diagrams collectively illustrating a method of setting a provisional time when an own vehicle is running on a road where an emergency parking zone is installed according to the $1^{st}$ embodiment of the present disclosure;

FIGS. 5A and 5B are diagrams illustrating a road with an evacuation space and a road without the evacuation space, respectively, according to the $1^{st}$ embodiment of the present disclosure;

FIGS. 8A to 8C are diagrams illustrating a method of performing evacuation resumption determination in the second embodiment of the present disclosure;

FIG. 14 is a wide-area map illustrating an expected vehicle stopping segment according to the third embodiment of the present disclosure.

DETAILED DESCRIPTION

Figure 1:
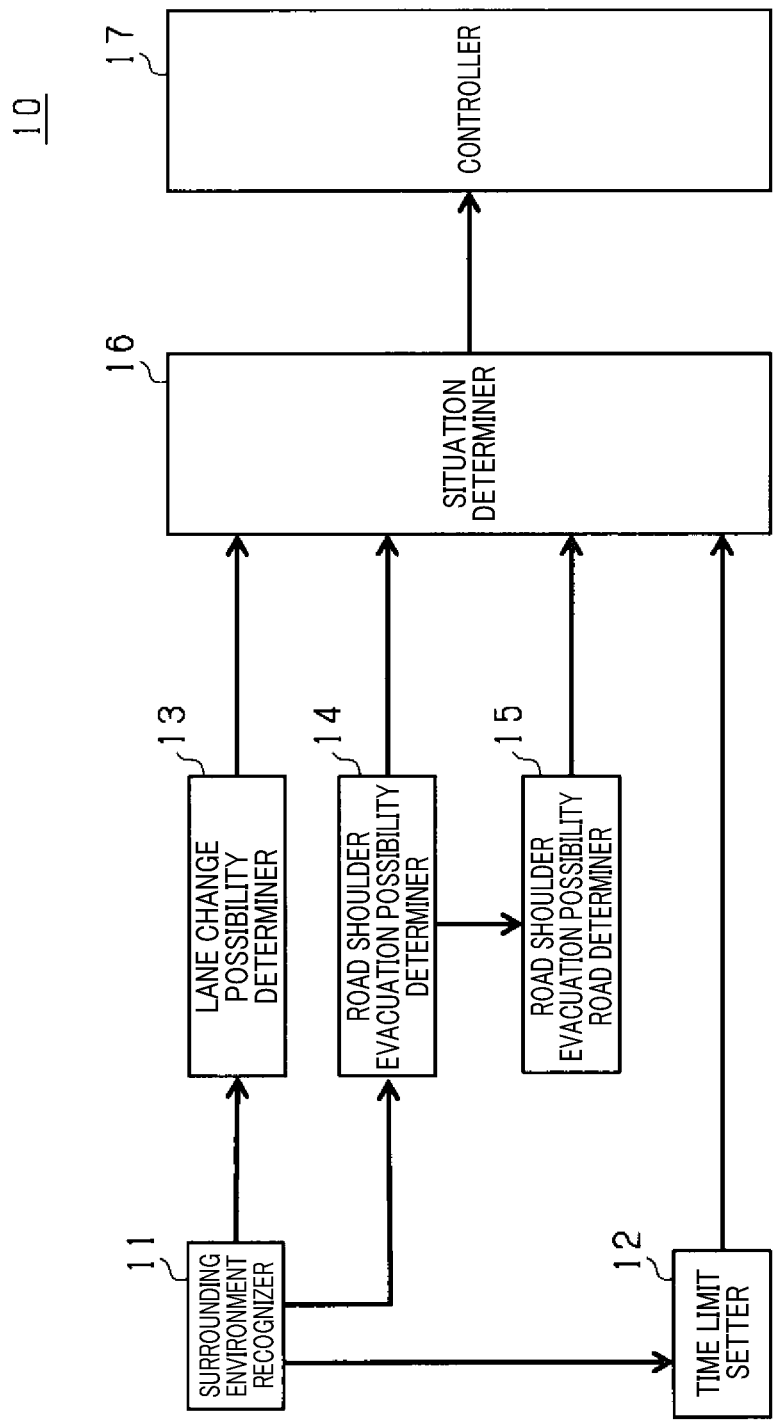
FIG. 1 is a block diagram illustrating an exemplary evacuation running assistance system according to a first embodiment of the present disclosure.

Referring now to the drawings, wherein like reference numerals designate identical or corresponding parts throughout the several views thereof and to FIG. 1, a first embodiment will be hereinbelow described. As illustrated in FIG. 1, an evacuation running assistance system 10 is a device mounted on a vehicle or the like having a function of assisting the vehicle to run and stop at a safe evacuation destination when a driver becomes unable to drive the vehicle due to lowering of consciousness or the like. The evacuation running assistance system 10 includes a surrounding environment recognizer 11, a time limit setter 12, and a lane change possibility determiner 13. The evacuation running assistance system 10 also includes a road shoulder evacuation possibility determiner 14, a road shoulder evacuation possibility road determiner 15, and a situation determiner 16. The evacuation running assistance system 10 further includes a controller 17. The evacuation running assistance system achieves each of these functions when a CPU (Central Processing Unit) runs given programs installed in a ROM (Read Only Memory) included in an ECU (Electronic Control Unit). The ECU is mounted on a vehicle together with the CPU, a RAM (Random Access Memory), and I/O (Input/Output) ports or the like.

Here, the surrounding environment recognizer 11 is configured to recognize a presence of at least a space on a road shoulder and a vehicle running around an own vehicle. For example, the surrounding environment recognizer 11 can recognize a type and a size of an object present around the own vehicle based on object detection information, such as an in-vehicle radar device, an imaging device, etc., obtained from an object detector. The surrounding environment recognizer 11 is enable to similarly recognize a distance of the object from the own vehicle, and a relative speed thereof from the own vehicle. Further, the surrounding environment recognizer 11 is enable to acquire road information about a road on which an own vehicle travels and other roads located around the own road based on map information received, for example, by an in-vehicle GNSS (Global Navigation Satellite System) receiver or the like. Here, the road information includes information of a road shape, a lane, and a connection point. The road information also includes information of a road boundary and the like. The surrounding environment recognizer 11 is enable to recognize a space on a road shoulder based on the object detection information and/or the map information. The surrounding environment recognizer 11 is enable to recognize vehicles or the like around the own vehicle based on the object detection information.

Further, the time limit setter 12 is configured to set a time limit on an own vehicle to continue evacuation running. Here, the time limit is a period starting from a time when it is determined that a driver is unable to drive to a time when an own vehicle completes and stops evacuation running. The time limit is determined to be a given time not to seriously delay a rescue request. Hence, the time limit setter 12 can be configured to determine the time limit in accordance with the road information and the object detection information as acquired from the surrounding environment recognizer 11.

Further, the lane change possibility determiner 13 is configured to determine if an own vehicle can change lanes. specifically, the lane change possibility determiner 13 determines if it is possible for the own vehicle to change lanes to an adjacent lane from a lane on which the own vehicle travels (i.e., an own lane), when the surrounding environment recognizer 11 recognizes an existence of a space on a road shoulder and the adjacent lane between the own lane and the space of the road shoulder neighbors on the own lane.

Further, the road shoulder evacuation possibility determiner 14 is configured to determine if an own vehicle can be evacuated to the road shoulder in accordance with a space on the road shoulder recognized by the surrounding environment recognizer 11. That is, the road shoulder evacuation possibility determiner 14 determines if the own vehicle can be evacuated to the road shoulder. Specifically, when it can be determined in accordance with a position and a size of the space on the road shoulder recognized by the surrounding environment recognizer 11, and a position, a size, and a running speed of the own vehicle that the space on the road shoulder allows the own vehicle to safely stop there, the road shoulder evacuation possibility determiner 14 determines that evacuation of the own vehicle to the road shoulder is possible.

Further, the road shoulder evacuation possibility road determiner 15 is configured to acquire evacuation space information from a past running history generated by an own vehicle. Here, the evacuation space information relates to a space on a road, to which evacuation of the own vehicle travelling along the road is allowed. Specifically, the road shoulder evacuation possibility road determiner 15 determines in accordance with the information of evacuation space if the road on which the own vehicle travels allows the own vehicle to be evacuated from the road to the road shoulder. Here, the past running history of the own vehicle may be initialized (by a controller) at least one of when a given history holding time has elapsed and when an own vehicle has been changed a road to travel. For example, a highly practical driving history can be obtained and used by initializing the past running history, for example, when the number of a national highway line is changed to one of the other numbers as noted based on the map information as acquired.

Further, the road shoulder evacuation possibility road determiner 15 may be configured to acquire information on an emergency parking zone installed in a road where an own vehicle travels or a road shoulder to allow evacuation as information of evacuation space. The road shoulder evacuation possibility road determiner 15 may subsequently set a given time for a provisional time in accordance with presence or absence of the evacuation space and a positional relation between evacuation spaces.

Further, the own vehicle situation determiner 16 may be configure to determine that an own vehicle is in one of situations where evacuation running is to be continued, on-lane stopping is to be performed to stop on an own lane, and evacuation to a road shoulder is to be performed. Specifically, the own vehicle situation determiner 16 determines a situation of the own vehicle in accordance with the time limit set by the time limit setter 12 and the road shoulder evacuation possibility of the own vehicle as determined by the road shoulder evacuation possibility determiner 14.

Further, the own vehicle situation determiner 16 can be configured to determine a situation of an own vehicle in accordance with a place located within a lane where the own vehicle travels to allow the own vehicle to stop as an evacuation space (hereinafter simply referred to as an on-lane stopping place) instead of the space on the road shoulder. Hence, the evacuation running assistance system 10 may be configured to store an on-lane stopping place list that lists on-stopping places by referring to a past driving history of an own vehicle and road information received from the GNSS receiver. Further, the own vehicle situation determiner 16 may be configured to refer to the on-lane stopping place list and determine that the own vehicle is in a situation to be controlled to stop at the on-lane stopping place when the own vehicle can stop at the on-lane stopping place included in the list within either the time limit or the provisional time. Here, as on-lane stopping places possible to list on the list, an entrance and an exit of an expressway, a service area, and a parking area or the like may be exemplified. Here, the on-lane stopping place is preferably a place that allows a prompt rescue.

Further, the controller 17 is configured to control an own vehicle in accordance with a situation of the own vehicle determined by the own vehicle situation determiner 16. That is, when it is determined that the own vehicle is in a situation to be controlled to continue evacuation running by running along the own lane or changing lanes and the like, the controller 17 controls the own vehicle to continue the evacuation running. By contrast, when it is determined that the own vehicle is in a situation to be controlled to perform the on-lane stopping, the controller 17 controls the own vehicle to stop in the lane (i.e., perform the on-lane stopping) while notifying a subsequent vehicle of stopping and/or decelerating of the own vehicle. Further, when it is determined that the own vehicle is in a situation to be controlled to perform evacuation to a road shoulder, the controller 17 controls the own vehicle to move, decelerate, and stop at the road shoulder serving as an evacuation destination. Similarly, when it is determined that the own vehicle is in a situation to be controlled to stop at the on-lane stopping place, the controller 17 controls the own vehicle to stop at the on-lane stopping place as an evacuation destination.

Figure 2:
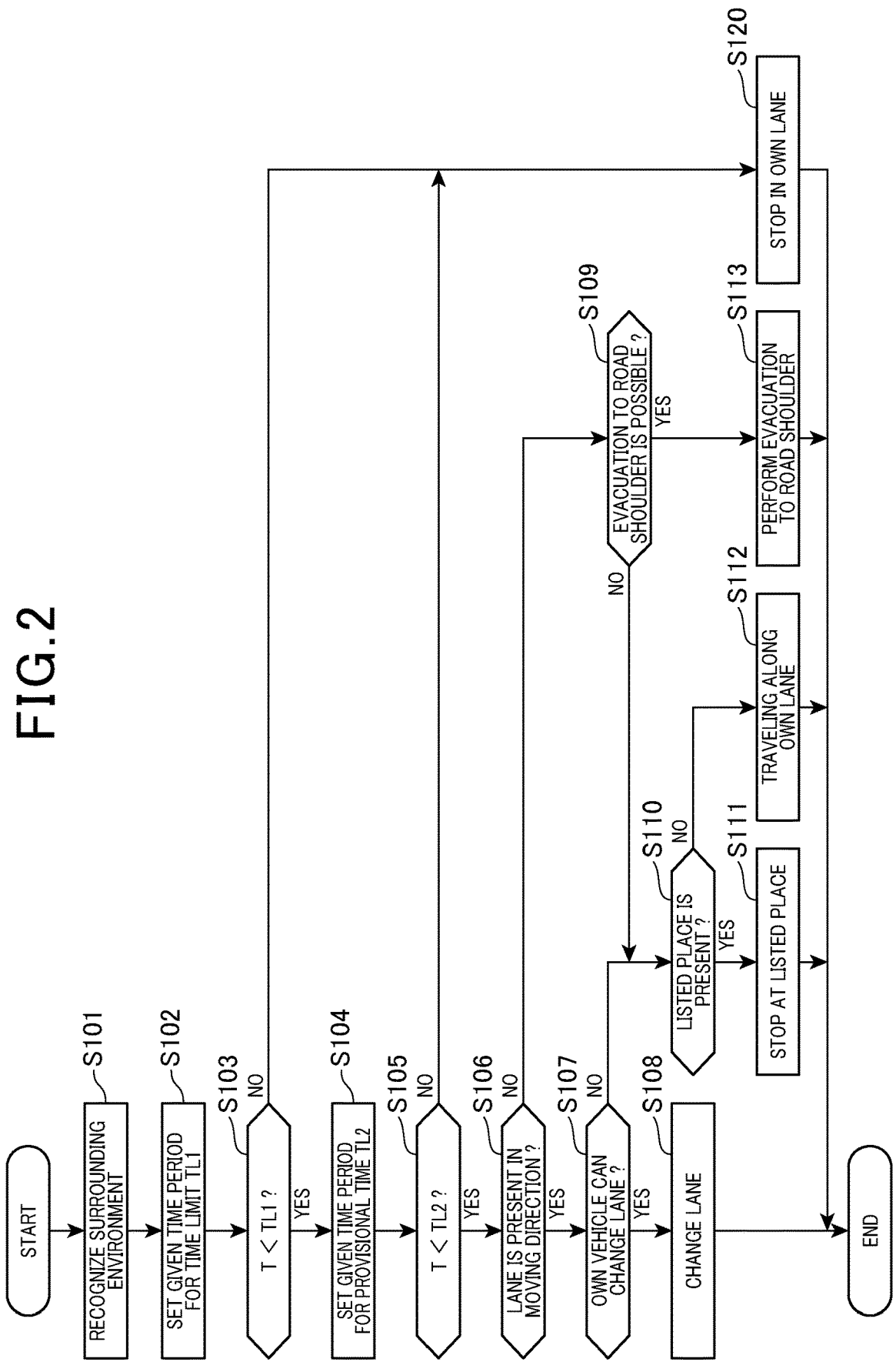
FIG. 2 is a flowchart illustrating an evacuation running assistance process performed in the first embodiment of the present disclosure.

FIG. 2 is a flowchart illustrating an evacuation running assistance process executed and repeated at a given cycle by the evacuation running assistance system 10.

In step S101, the evacuation running assistance system 10 recognizes surrounding environment around an own vehicle. Specifically, the evacuation running assistance system 10 acquires object detection information from the object detector, and recognizes presence of a space on the road shoulder and other vehicles around the own vehicle based thereon. Subsequently, the process proceeds to step S102.

In step S102, the evacuation running assistance system 10 sets a time limit TL1. Here, the time limit TL1 is an upper limit for an own vehicle to be able to continue evacuation running. That is, continuous evacuation running of the own vehicle without limit may hinder rescue of a driver. Hence, the time limit TL1 of a given time suitable for the rescue of a driver is set. Subsequently, the process proceeds to step S103.

In step S103, the evacuation running assistance system 10 compares a current time T with the time limit TL1. Here, the current time T represents a time started from when it is determined that a driver cannot drive up to a present time. Hence, when the below described inequality is met, the process proceeds to step S104.

$$T<TL1$$

By contrast, when the below described inequality is met, the process proceeds to step S120.

$$T≥TL1$$

In step S120, it is determined that the own vehicle is in a situation to be controlled to perform on-lane stopping to stop at the lane on which the own vehicle travels. Subsequently, the process is terminated.

In step S104, a given time is set for a provisional time TL2. The given time is set for the provisional time TL2 to be equal or less than the time limit TL1 (i.e., TL2 TL1). Here, the provisional time TL2 is set in accordance with evacuation space information obtained from a past running history generated by the own vehicle. For example, when it is determined in accordance with the evacuation space information that a road on which an own vehicle travels is a type that allows the own vehicle to be evacuated to a road shoulder, the value TL2 is calculated to meet the below described equality.

$$TL2=TL1$$

By contrast, when it is determined that a road on which an own vehicle travels is a type that does not allow the own vehicle to be evacuated to the road shoulder, the value TL2 is calculated to meet the below described equality. TL2=0 (zero). Subsequently, the process proceeds to step S105.

Further, in step S105, the current time T is compared with the provisional time TL2. When the below described inequality is met, the process proceeds to step S106.

$$T<TL2$$

By contrast, when the below described inequality is met, the process proceeds to step S109.

$$T≥TL2$$

In step S106, it is determined if another lane is present beside the own lane in a direction in which the own vehicle is moving for evacuation (herein after sometimes simply referred to as a moving direction). Here, a lane in the moving direction is a lane located closer to an evacuation space than the own vehicle, and is present between the own lane and the evacuation space. Hence, if the moving side lane is present, the process proceeds to step S107. By contrast, if there is no lane in the moving direction, the process proceeds to step S110.

In step S107, it is determined if the own vehicle can change lanes to the lane in the moving direction. For example, it can be determined if the own vehicle can change lanes in accordance with the road information related to other roads around an own vehicle. It can also be determined if the own vehicle can change lanes in accordance with object detection information related to objects (especially vehicles) around the own vehicle, and a traveling speed of the own vehicle as acquired in step S101 or the like. Subsequently, when it is determined that a change of lanes is possible, the process proceeds to step S108, and the own vehicle is controlled to change lanes. Then, the process is completed. Hence, as performed in steps S105 to S108, when the inequality T<TL2 is met, the lane is present in the moving direction, and changing of lanes in the moving direction is possible, the own vehicle is controlled to change lanes so as to continue evacuation running. Here, a change of lanes is a process executed when an own vehicle is in a situation to be controlled to continue evacuation running.

Further, in step S109, it is determined if evacuation to a road shoulder is possible. When it is determined that the evacuation to the road shoulder is possible, the process proceeds to step S113 and evacuation to the road shoulder is executed in the step. Hence, as performed in steps S105, S106, S109, and S113, when the inequality T<TL2 is met, and there is no lane in the moving direction, it is determined that the evacuation to the road shoulder is to be performed and evacuation to the road shoulder is executed.

Further, in step S110, the list of on-lane stopping places as stored is referred to, and it is determined if there is an on-lane stopping place where an own vehicle can stop within the provisional time in the list (herein below simply referred to as a corresponding (or qualified) on-lane stopping place). If there is a corresponding on-lane stopping place, the process proceeds to step S111. Then, in step S111, the own vehicle is evacuated to and stopped at the corresponding on-lane stopping place. Subsequently, the process is terminated. Hence, when there is the corresponding on-lane stopping place, the own vehicle is controlled to continuously drive on its own lane. Accordingly, even when the inequality T<TL2 is met, there is a neighboring lane in a moving direction of the own vehicle, but it is impossible for an own car to change lanes to the neighboring lane as determined in steps S105 to S107, S110, and S111, a process of stopping the own vehicle at an on-lane stopping place can be performed if it exists. That is, such a process is executed when the own vehicle is in a situation to be controlled to stop at an on-lane stopping place. By contrast, when there is no on-lane stopping place, own lane driving is executed as performed in step S112. That is, such a process is executed when an own vehicle is in a state to be controlled to continue evacuation driving, but a change of lanes to a neighboring lane is impossible.

Figure 3:
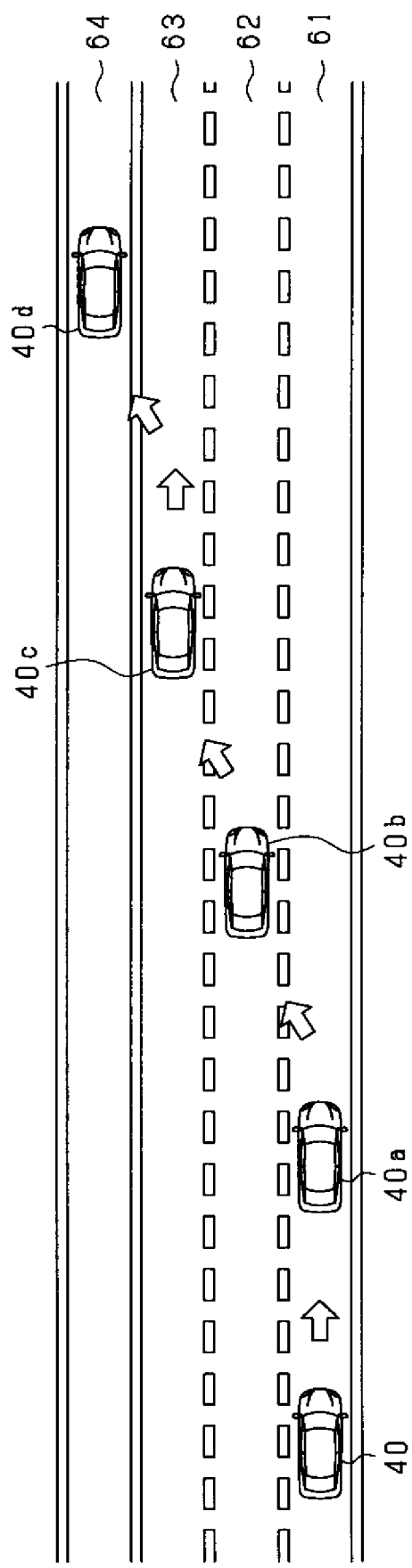
FIG. 3 is a diagram illustrating exemplary evacuation running performed in the $1^{st}$ embodiment of the present disclosure.

Further, as illustrated in FIG. 3, when it is determined that a driver becomes unable to drive at an own vehicle position 40a, surrounding environment information is acquired in step S101. When it is determined in accordance with the surrounding environment information as acquired that there is a road shoulder 64 that can allow the own vehicle 40 to stop, each of the time limit TL1 and the provisional time TL2 is set and compared with a current time T in steps S102 to S105. As performed in steps S106 to S108, when the inequality T<TL2 is met, the own vehicle is controlled to change lanes from the lane 61 as the own lane to a lane 62 which is neighboring lane in the moving direction, and the own vehicle 40 moves from the own vehicle position 40a to another own vehicle position 40b. A similar process is performed, so that the own vehicle 40 is controlled to change lanes from the lane 62 as the own lane to a new lane 63 as a lane in the moving direction. Hence, the own vehicle 40 moves from the own vehicle position 40b to yet another own vehicle position 40c.

At the own vehicle position 40c, since there is no lane between the lane 63 as the own lane and the road shoulder 64, the own vehicle is evacuated from the lane 63 as the own lane to the road shoulder 64 as performed in steps S106, S109, and S113. Hence, the own vehicle 40 moves from the own vehicle position 40c to an own vehicle position 40d and stops at the own vehicle position 40d. According to the process illustrated in FIG. 2, the own vehicle 40 traveling on the lane 61 can be evacuated to the road shoulder 64.

Further, as illustrated in FIG. 4, when there are on-lane stopping places 65a and 65b, the own vehicle 40 can be evacuated to the on-lane stopping places 65a and 65b as evacuation spaces. Here, the on-lane stopping places 65a and 65b are emergency parking zones installed on a road where an own vehicle travels.

In such a situation, the provisional time TL2 can be set in accordance with a positional relation between the on-lane stopping places 65a and 65b. For example, the provisional time TL2 can be calculated by dividing a distance d1 between mutual distal ends as illustrated in FIG. 4A by a vehicle speed V of the own vehicle 40 (i.e., TL2=d1/V). Here, the distal ends represent a left end of the on-lane stop position 65a and a right end of the on-lane stopping place 65b, respectively. Otherwise, as illustrated in FIG. 4B, the provisional time TL2 can be calculated by dividing a distance d2 between mutual proximal ends (i.e., a right end of the on-lane stopping place 65a and a left end of the on-lane stopping place 65b) by a vehicle speed V of an own vehicle 40 (i.e., TL2=d2/V), for example. Here, the proximal ends represent a right end of the on-lane stopping place 65a and a left end of the on-lane stopping place 65b. Alternatively, as illustrated in FIG. 4C, the provisional time TL2 can be calculated by dividing a distance d3 between arbitrary positions (e.g., a central position in the on-lane stopping place 65a in a lane extension direction and a center position in the on-lane stopping place 65b in a lane extension direction) by a vehicle speed V of an own vehicle 40 (i.e., TL2=d3/V), for example. That is, a given time is set for the time limit TL2 to reduce a risk that an accident occurs by excessively driving more than the time limit TL2 even though it is impossible to reach an emergency parking zone, for example, within the time limit TL2. Specifically, emergency parking zones are generally installed at given intervals. Although it depends on a speed of an own vehicle, but since the own vehicle basically decelerates to a minimum vehicle speed when a driver becomes unable to drive, it is difficult for the own vehicle to park in an emergency parking zone coming after the next one within the time limit TL2. Hence, a given time is assigned to TL2 in which the own vehicle can parked in an emergency parking zone coming next. That is, the TL2 is defined based on an interval between neighboring emergency parking zones.

Further, as illustrated in FIG. 5A, when there is no on-lane stopping place, such as an emergency parking zone, etc., on a road around the own vehicle 40, but an evacuation possible road shoulder 64 is present, it is preferable that the time limit TL1 is set for the provisional time TL2 (i.e., TL2=TL1). By contrast, as illustrated in FIG. 5B, when there is no on-lane stopping place nor a road shoulder on a road around the own vehicle 40, it is preferable that zero is set for the provisional time TL2 (i.e., TL2=0). Hence, since the equality TL2=0 is established, determination in step S105 is negative, and accordingly the process proceeds to step S120, the own vehicle is controlled to immediately stop at the own lane. That is, when the own vehicle 40 is traveling in either the lane 62 or the lane 63 illustrated in FIG. 5B, the own vehicle cannot move to an evacuation space even if the own vehicle performs own lane driving until the time limit TL1 elapses. Hence, according to the evacuation running assistance system 10, even in a situation illustrated in FIG. 5B, the road shoulder evacuation possibility road determiner 15 determines that a road on which the own vehicle travels is not a road that allows the own vehicle to be evacuated to a road shoulder in accordance with information of an evacuation space. Then, the road shoulder evacuation possibility road determiner 15 sets zero for the provisional time TL2. As a result, the own vehicle can be stopped immediately on the lane without waiting for elapsing of the time limit.

Figure 6:
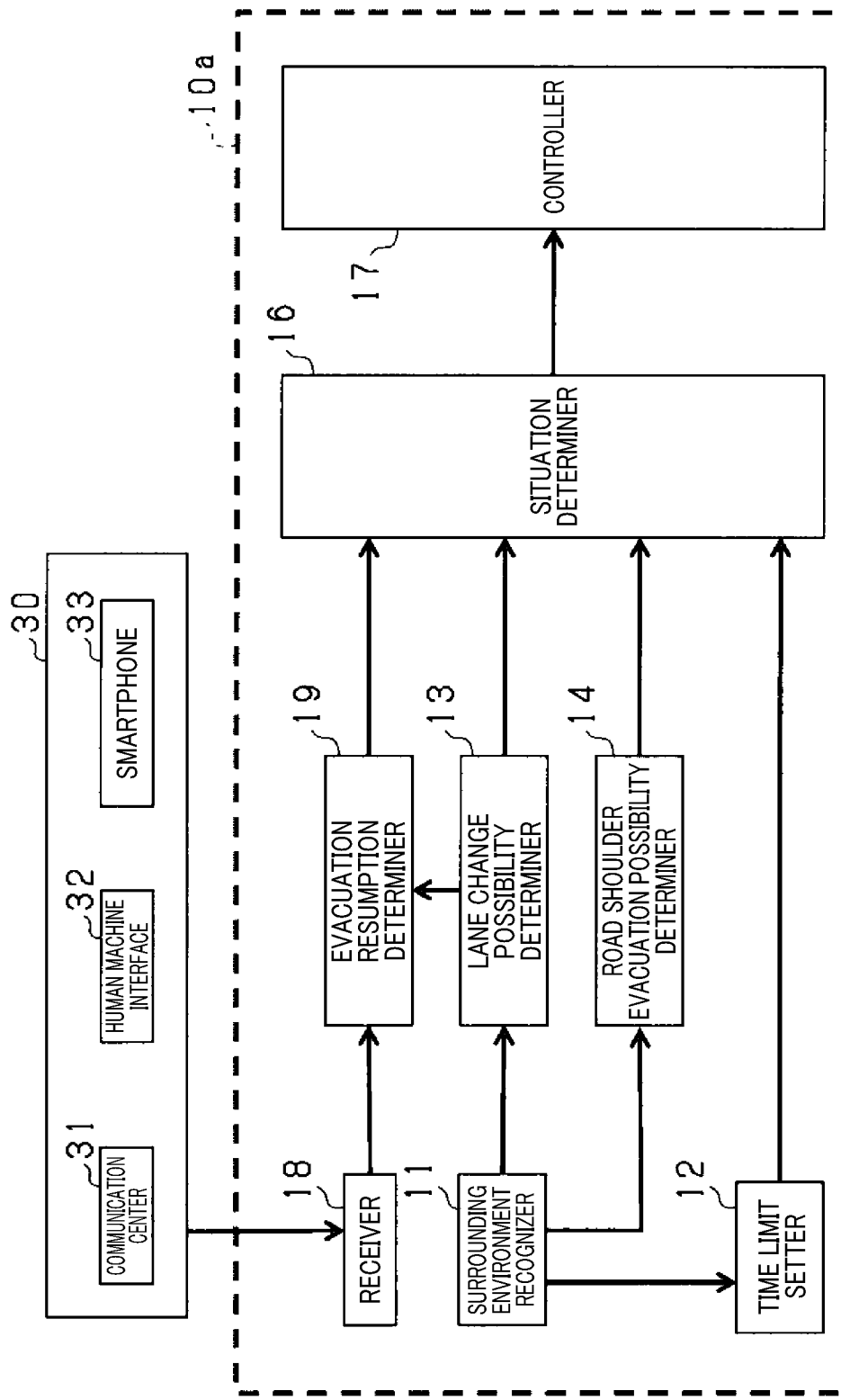
FIG. 6 is a block diagram illustrating an exemplary evacuation running assistance system according to a second embodiment of the present disclosure.

Next, a second embodiment will be hereinbelow described with reference to FIG. 6 and applicable drawings. Like the evacuation running assistance system 10 illustrated in FIG. 1, an evacuation running assistance system 10a of this embodiment illustrated in FIG. 6 is similarly mounted on a vehicle or the like and assists a vehicle (and/or a driver) to run and stop at a safe evacuation destination when a driver becomes unable to drive. However, the evacuation running assistance system 10a includes the surrounding environment recognizer 11, the time limit setter 12, and the lane change possibility determiner 13. The evacuation running assistance system 10a also includes the road shoulder evacuation possibility determiner 14, the own vehicle situation determiner 16, and the controller 17. The evacuation running assistance system 10a further includes a receiver 18 and an evacuation resumption possibility determiner 19.

Here, the receiver 18 receives information from an external communication device 30 installed outside of the evacuation running assistance system 10a. The receiver 18 then transmits the information as received to the evacuation resumption possibility determiner 19. Here, as the external communication device 30, a system of a communication center 31, an HMI (Human Machine Interface) 32 serving as a means of transmitting information between a human and a machine, and a portable communication device, such as a smartphone 33, etc., are exemplified.

The evacuation resumption possibility determiner 19 determines if an own vehicle can resume evacuation running in accordance with a given condition after on-lane stopping is performed on an own lane where the own vehicle is driving. Here, the evacuation resumption possibility determiner 19 can determine if evacuation resumption is performed based on a result of such determination made by in-vehicle software stored in an ECU mounted on a vehicle or the like. Otherwise, the evacuation resumption possibility determiner 19 can determine if evacuation resumption is performed based on a result of such determination obtained by the evacuation resumption possibility determiner 19 from the external communication device 30 via the receiver 18.

Here, the system of the communication center 31 may transmit a result of determination made by a person or a machine at a remote place as to if evacuation can be resumed. Hence, with the receiver 18 and the evacuation resumption possibility determiner 19, the system of the communication center 31 is enabled to remotely control an own vehicle.

Further, the HMI 32 and the smartphone 33 may be configured to transmit a determination of a passenger accompanying a driver in an own vehicle, for example. For example, by installing an application in the smartphone 33, which enables transmission of instructions of an operator operating the smartphone 33 to the evacuation running assistance system 10a mounted on the own vehicle, the evacuation running assistance system 10a can determine evacuation resumption possibility based on a determination result of the passenger acting as the operator, like the HMI 32. Remaining configurations similarly employed in the evacuation running assistance system 10a are substantially the same as corresponding configurations employed in the evacuation running assistance system 10 illustrated in FIG. 1. Hence, the same description is not repeated.

Figure 7:
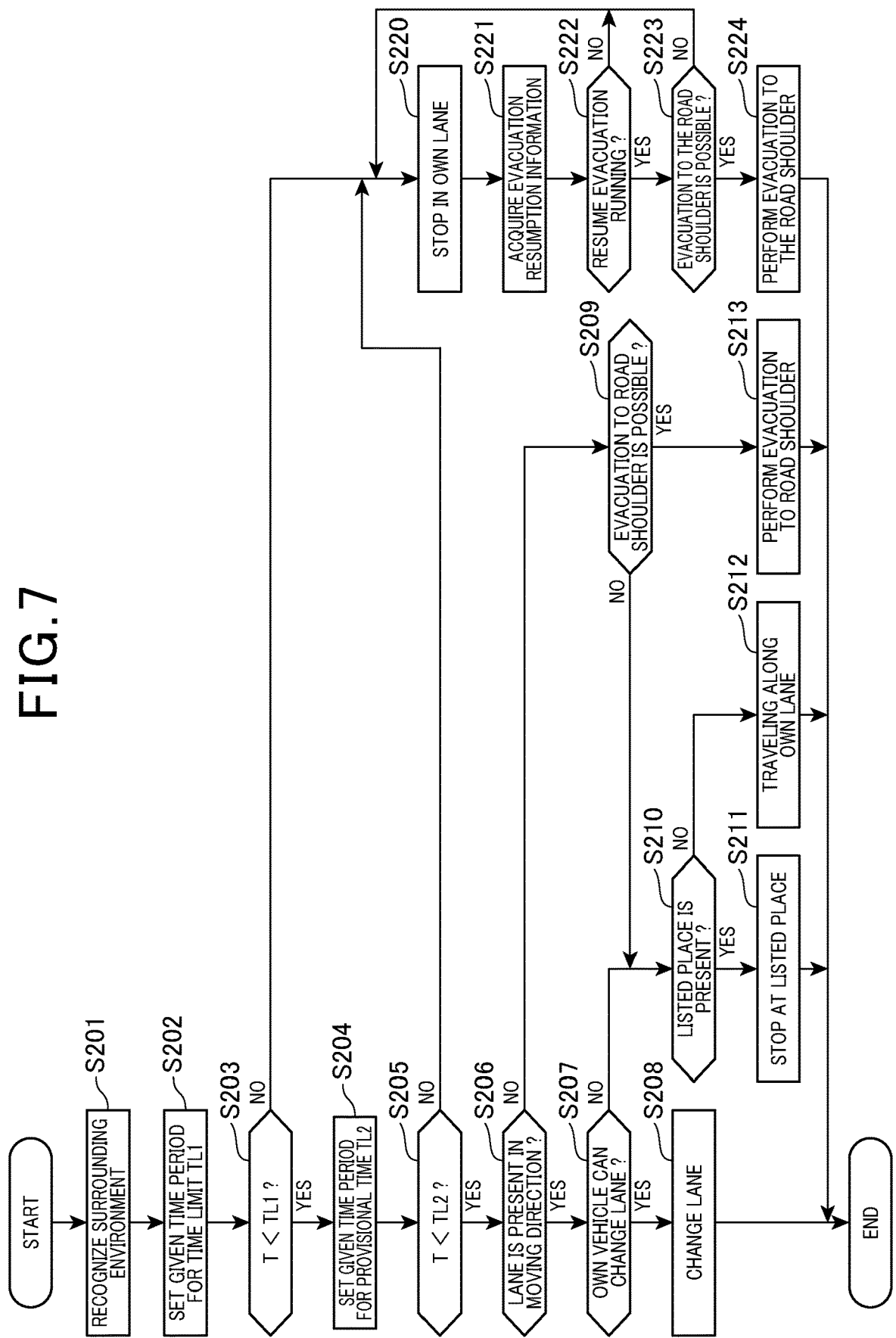
FIG. 7 is a flowchart illustrating an evacuation running assistance process performed in the second embodiment of the present disclosure.

FIG. 7 is a flowchart illustrating an evacuation running assistance process executed by the evacuation running assistance system 10a of the second embodiment of the present disclosure. The evacuation running assistance system 10a repeats the evacuation running assistance process illustrated in FIG. 7 at a given cycle. Since each process performed in steps S201 to S220 of FIG. 7 is substantially the same as that performed in steps S101 to S120 of FIG. 2 (i.e., the first embodiment). Hence, the same description is not repeated.

As shown there, however, the flowchart of FIG. 7 is different from the flowchart of FIG. 2 in that processes of steps S221 to S224 are additionally included after step S220. That is, in step S220, the process of stopping the own vehicle in the own lane is executed. Then, the process proceeds to step S221.

In step S221, evacuation resumption information is acquired. Specifically, an evacuation resumption possibility determination result is acquired via the external communication device 30 and/or the evacuation resumption determination result calculated by the in-vehicle software is acquired. Subsequently, the process proceeds to step S222.

In step S222, it is determined if evacuation running can be resumed. In step S222, if it is determined that the evacuation running can be resumed, the process proceeds to step S223. By contrast, it is determined that the evacuation running cannot be resumed, the process returns to step S220. Then, the own vehicle is controlled to continuously stop at the own vehicle lane.

Hence, in step S223, it is determined if the own vehicle can be evacuated to a road shoulder. When it is determined that the evacuation thereto is possible, the process proceeds to step S224. Then, in step S224, the own vehicle is controlled to be evacuated to the road shoulder as an evacuation destination.

Hence, according to the evacuation running assistance process of FIG. 7, when the own vehicle 41 is stopped in the own lane 61, and other vehicles 51a to 51c are detected in a lane 63 toward which the own vehicle moves as illustrated in FIG. 8A, A determination becomes negative in step S222. The, the process returns to step S220 and the own vehicle 41 continues the on-lane stopping. By contrast, when only another vehicle 52 is detected in the lane 63 as illustrated in FIG. 8B, determinations become positive in respective steps S222 and S223, and the own vehicle 42 is controlled to be evacuated to and stop at the road shoulder 64. Hence, according to the evacuation running assistance system 10a, as illustrated in FIG. 8A, when it is determined from the surrounding environment information that evacuation of the own vehicle to the road shoulder is impossible, and accordingly own-lane stopping is performed, the own vehicle can be stopped on the lane without waiting for elapse of the time limit by using the provisional time TL2. After that, when it is determined based on surrounding environment information of the own vehicle that evacuation to a road shoulder is possible as illustrated in FIG. 8B, evacuation running is resumed and the own vehicle can be evacuated to the road shoulder safer than the lane. Here, when evacuation of the own vehicle to the road shoulder is resumed, the controller 17 can be configured to control the own vehicle based on remote control performed by a communication facility. That is, even if a driver is unable to drive, it is possible to perform evacuation running of an own vehicle by means of remote control.

Further, as illustrated in FIG. 8C, the evacuation resumption possibility determiner 19 can be configured to determine evacuation resumption possibility of an own vehicle stopped at a road shoulder of a road. With such a configuration, when it is determined that evacuation resumption is possible after the own vehicle is evacuated and stopped at the road shoulder 64, and a passenger then gets off the own vehicle in the road shoulder 64, the own vehicle can be controlled to move to a side edge as shown by an own vehicle position 43a as illustrated in FIG. 8C, for example. Here, it is preferable that the evacuation resumption possibility determiner 19 is configured to determine that it is possible to resume evacuation running of the own vehicle regardless of the time limit, when the own vehicle completes the evacuation to the road shoulder and the passenger has got off the own vehicle.

For example, the own vehicle may move aside across a space secured between the own vehicle and a wall of a road for a passenger to disembark from the own vehicle when the own vehicle has stopped at the road shoulder. Hence, safety can be ensured for passengers who get on and off the own vehicle.

Figure 9:
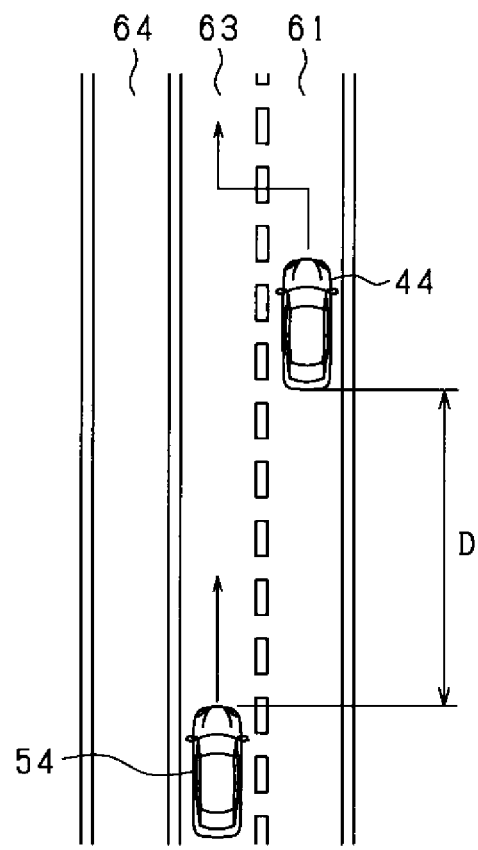
FIG. 9 is a diagram also illustrating a method of performing evacuation resumption determination in the second embodiment of the present disclosure.

Further, the evacuation resumption possibility determiner 19 can be configured to determine if an own vehicle can resume evacuation running in accordance with a legal speed of a road where the own vehicle is stopped. Also, the evacuation resumption possibility determiner 19 can be configured to determine if an own vehicle can resume evacuation running in accordance with a vehicle speed of a rear side vehicle running right or left thereof behind the own vehicle, and a distance from the own vehicle thereto. For example, in a situation illustrated in FIG. 9, another vehicle 54 is travelling at a speed V2 behind the own vehicle along a lane 63, toward which the own vehicle stopped in the own lane 61 moves. In such a situation, the evacuation resumption possibility determiner 19 can be configured to determine that the own vehicle 44 can resume evacuation running when an inequality D>Ds is met. Here, D represents a distance between a rear end of the own vehicle 44 and a front end of the other vehicle 54, and Ds represents a mileage needed for the other vehicle 54 until it stops running to avoid collision with the own vehicle 44. That is, when the inequality D>Ds is met, the own vehicle 44 in a stopped state can complete changing lanes from the lane 61 to the lane 63. Further, when a time needed for the own vehicle 44 in the stopped state to complete changing of lanes from the lane 61 to the lane 63 is represented by T1 as a lane change time, the distance Ds can be calculated based on the lane change time T1 and the speed V2. That is, for example, a distance Ds can be calculated by the below described equality when it is assumed that an average speed of the other vehicle 54 traveling the distance Ds (and is finally stopped) is represented by V2/2. Ds=(V2×T1)/2. The average speed is calculated by averaging various speeds at which the other vehicle decelerates and stops running or changing lanes to avoid the own vehicle.

Here, instead of the speed of the other vehicle 54, a legal speed Vh assigned to a road on which the own vehicle 44 and the other vehicle 54 travel may be used. Hence, by determining based on the speed V2 or the legal speed Vh, the evacuation resumption possibility determiner 19 can flexibly determine a possibility of resumption of evacuation running of the own vehicle 44 in accordance with a situation.

Further, the above-described receiver 18 and the evacuation resumption possibility determiner 19 or the like employed in the second embodiment can be combined with the first embodiment and a later described third embodiment and are used. Further, the above-described evacuation resumption possibility determiner 19 can be applied not only to a situation where an own vehicle stops at a lane in the provisional time before the time limit, but also a situation where the own vehicle stops at the lane after elapse of the time limit. That is, the evacuation resumption possibility determiner 19 or the like described in the second embodiment can be applied to the evacuation running assistance system that determines a situation of an own vehicle by using a situation determiner while setting a time for a time limit without setting a time for the provisional time. In both situations, however, substantially the same advantage can be obtained.

Figure 10:
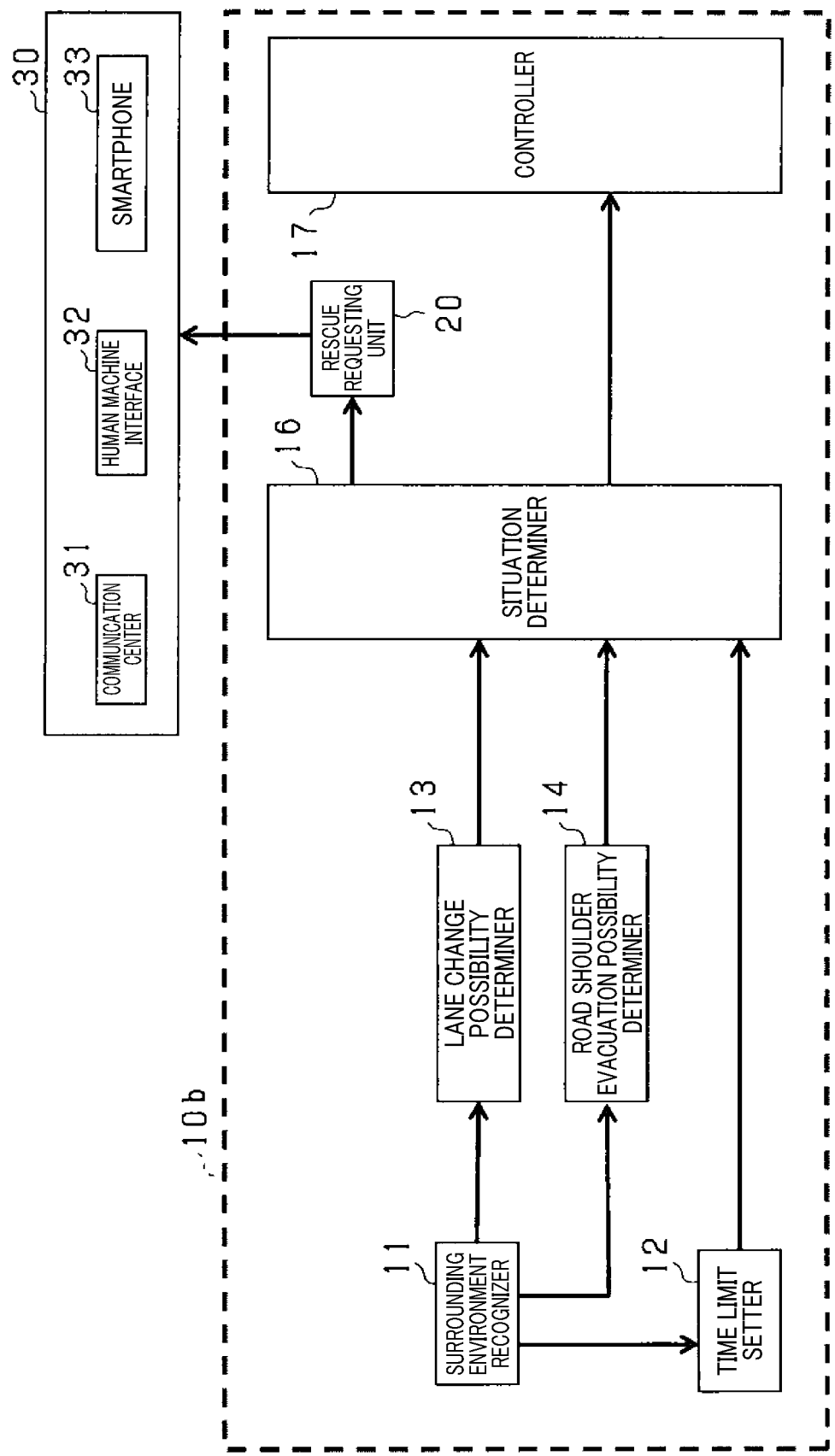
FIG. 10 is a block diagram illustrating an exemplary evacuation running assistance system according to a third embodiment of the present disclosure.

Next, a third embodiment will be hereinbelow described with reference to FIG. and applicable drawings. Like the evacuation running assistance systems 10 and 10a as illustrated in FIGS. 1 and 6, respectively, an evacuation running assistance system 10b of this embodiment illustrated in FIG. 10 is mounted on a vehicle or the like and assists the vehicle (and/or a driver) to run toward and stop at a safe evacuation destination when a driver becomes unable to drive. Specifically, the evacuation running assistance system 10b includes the surrounding environment recognizer 11, the time limit setter 12, and the lane change possibility determiner 13. The evacuation running assistance system 10b also includes the road shoulder evacuation possibility determiner 14, the own vehicle situation determiner 16, and the controller 17. The evacuation running assistance system 10b further includes a rescue requesting unit 20.

In the evacuation running assistance system 10b, the surrounding environment recognizer 11 is enabled to acquire information of a traffic jam caused in a distance by telecommunication. Further, the surrounding environment recognizer 11 is also enabled to identify a traffic jam lane (a lane with a traffic jam) based on map information. Such a surrounding environment recognizer 11 set a bifurcation point for a traffic jam end point, when the bifurcation point is present forward in the traffic jam lane. Specifically, surrounding environment recognizer 11 is enabled to identify the traffic jam lane based on the map information and determine as to if a bifurcation point is present based on lane information and/or connection point information of a corresponding (i.e., applicable) lane.

Further, like the evacuation running assistance system 10, the own vehicle situation determiner 16 determines a current situation of an own vehicle in accordance with both a time limit as set and a road shoulder evacuation possibility as determined. The own vehicle situation determiner 16 determines the current situation of the own vehicle by selecting one of situations where evacuation running is to be continued, on-lane stopping is to be performed, and evacuation to a road shoulder is to be performed, respectively.

In addition, when the surrounding environment recognizer 11 determines that evacuation to a road shoulder is impossible due to a traffic jam, the own vehicle situation determiner 16 determines before elapsing of a predetermined time limit that the own vehicle is in a situation to be controlled to perform on-lane stopping. Further, the own vehicle situation determiner 16 may also be configured to determine that an own vehicle is in a situation to be controlled to continue evacuation running, when it is expected that the own vehicle can reach a traffic jam end point where a traffic jam is solved within the predetermined time limit set by the time limit setter 12, for example.

Further, the rescue requesting unit 20 requests a rescue to an external communication center by telecommunication when it is determined that the driver has become unable to drive (i.e., operate). Specifically, the rescue requesting unit 20 sets a segment for a vehicle stop expected section between a traffic jam end point recognized by the surrounding environment recognizer 11 and a point that can be reached in a time limit set by the time limit setter 12. Then, the rescue requesting unit 20 notifies the communication center 31 of the expected vehicle stop section. Here, remaining configurations employed in the evacuation running assistance system 10b of this embodiment are substantially the same as the corresponding configurations employed in the evacuation running assistance system 10 illustrated in FIG. 1. Hence, the same description is not repeated.

Figure 11:
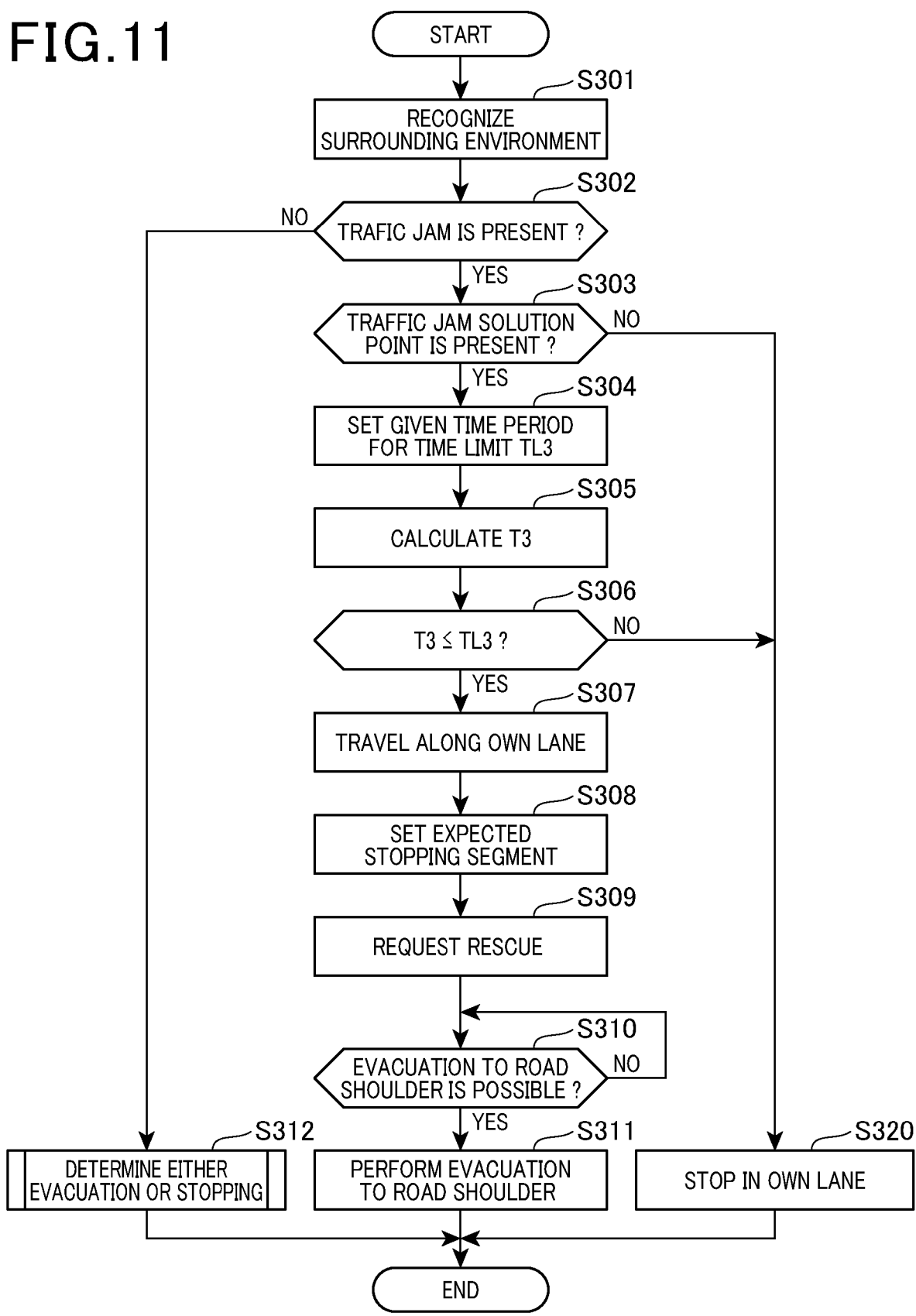
FIG. 11 is a flowchart illustrating an evacuation running assistance process performed in the third embodiment of the present disclosure.

FIG. 11 is a flowchart illustrating an evacuation running assistance process executed by the evacuation running assistance system 10b. The evacuation running assistance system 10b repeats the evacuation running assistance process of FIG. 11 at a given cycle.

Specifically, in step S301, a surrounding environment recognition process is performed. As performed in step S101, a space on a road shoulder and presence of other vehicles around an own vehicle are recognized by acquiring object detection information from the object detector. Information of a traffic jam generated in a distant also is acquired by telecommunication. In addition, map information is acquired and a lane causing the traffic jam is then identified based on the map information. When a bifurcation point is present forward in the lane with the traffic jam, a bifurcation point is set for a traffic jam end point. Subsequently, the process proceeds to step S302.

In step S302, it is then determined if a traffic jam has occurred on a road where an own vehicle travels based on the traffic jam information acquired in step S301. When it is determined that the traffic jam has occurred on the road, the process proceeds to step S303. By contrast, when it is not determined that the traffic jam has occurred on the road, the process proceeds to step S312. The process is terminated after step S312. Here, an evacuation and stopping determination process performed in step S312 is equivalent to the process illustrated by a flowchart in FIG. 2. That is, when it is determined that no traffic jam has occurred on the road, an evacuation running assistance process similar to that performed in the first embodiment is executed.

Further, in step S303, a traffic jam lane with the traffic jam is identified, and it is determined based on the map information as to if there is a traffic jam end point. That is, the traffic jam end point can be specified based on object detection information obtained from the object detector. However, it is more preferable to use map information. That is because, even if the traffic jam end point is located far beyond a range at which the object detector can detect an object, and accordingly the traffic jam end point cannot be recognized based on the object detection information, the traffic jam end point in the distance can be recognized based on the map information. Hence, if there is the traffic jam end point, the process proceeds to step S304. By contrast, if there is no traffic jam end point, the process proceeds to step S320. In step S320, it is determined that the own vehicle is in a state in which the own vehicle is to be stopped on a lane in which the own vehicle travels. That is, the own vehicle is in a state in which own-lane stopping is to be performed. The process is Subsequently terminated.

Further, in step S304, a given period is set for a time limit TL3. Here, the time limit TL3 represents an upper limit allowing an own vehicle to continue evacuation running and is determined to be a given level in view of a prompt rescue of a driver as same as the time limit TL1. Subsequently, the process proceeds to step S305.

In step S305, a current time T3 that indicates a time period starting from when a driver is determined to be unable to drive until a present time is calculated. Subsequently, the process proceeds to step S306. In step S306, the current time T3 is compared with the time limit TL3. When an inequality T3<TL3 is met, the process proceeds to step S307. By contrast, when an inequality T3≥TL3 is met, the process proceeds to step S320. In step S320, it is determined that an own vehicle is in a situation to be controlled to stop on a lane in which the own vehicle travels. That is, the own vehicle is in a situation in which own lane stopping is to be performed. The process is then terminated.

By contrast, in step S307, the own vehicle is controlled to continuously travel along the own lane. That is, although there is the traffic jam, it is determined in steps S302 and S303 that there is the traffic jam end point, and that the current time T3 has not reached the time limit TL3 in step S306. Hence, the own vehicle is controlled to continuously travel on (along) the own lane and is evacuated to the traffic jam end point. This process corresponds to one of exemplary situations where the own vehicle is controlled to continue evacuation running. Subsequently, the process proceeds to step S308.

Further, in step S308, a given segment is set for an expected stopping section of the own vehicle (i.e., a section where the own vehicle is expected to stop). Subsequently, the process proceeds to step S309 and a rescue request with information related to the stop expected section (segment) as set are transmitted. Subsequently, the process proceeds to step S310.

In step S310, it is determined if evacuation to a road shoulder is possible. For example, when the own vehicle reaches the traffic jam end point, it is determined that evacuation to the road shoulder is possible. When evacuation to the road shoulder is possible, the process proceeds to step S311. Here, such a process of step S310 is repeated until it is determined that evacuation to the road shoulder is possible. After step S311, the process is terminated. In step S311, evacuation of the own vehicle to the road shoulder is performed. Here, such a process of step S310 is repeated until it is determined that evacuation to the road shoulder is possible. After step S311, the process is terminated.

Figure 12:
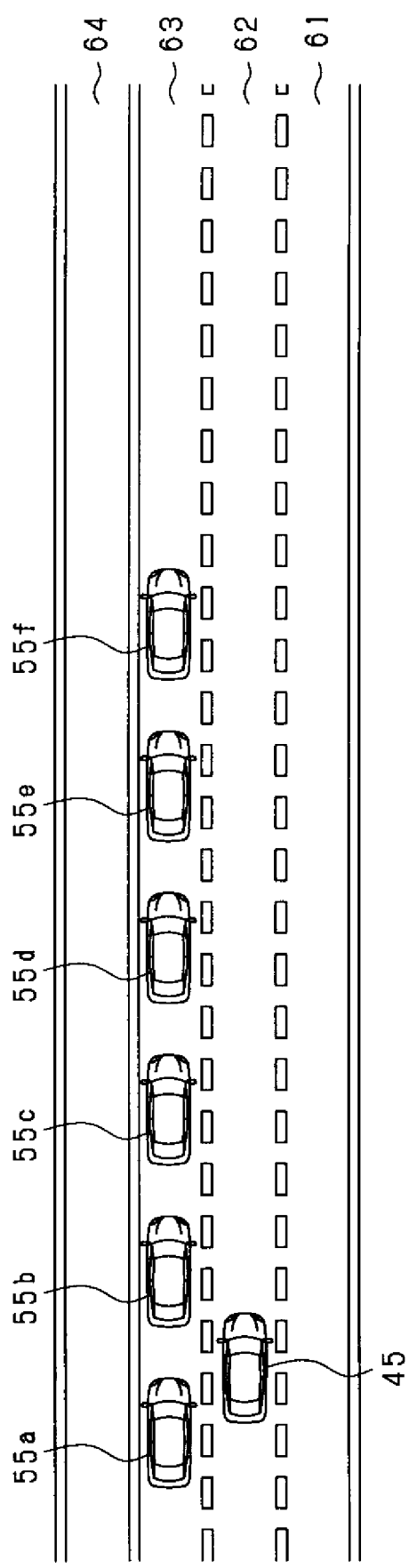
FIG. 12 is a diagram illustrating a situation where an own vehicle cannot be evacuated due to a traffic jam according to the third embodiment of the present disclosure.

Accordingly, as illustrated in FIG. 12, when it is determined that a driver becomes unable to drive during when an own vehicle 45 is traveling along a lane 62 as an own vehicle lane, a road shoulder 64 is recognized as an evacuation destination for the own vehicle in step S301. However, when a traffic jam is caused on a lane 63 next to an own lane to which an own vehicle moves by other vehicles 55a to 55f forming a queue thereon, the own vehicle 45 cannot be evacuated immediately to the road shoulder. Further, when there is such a traffic jam and a traffic jam end point is absent as determined in steps S302 and S303, respectively, by controlling the own vehicle 45 to promptly stop on the lane 62, it can be avoided to unnecessarily prolong a running time period after a diver becomes unable to drive. At the same time, a risk that confirmation of a lane and control of an own vehicle become insufficient, and accordingly the own vehicle 45 cannot run precisely along the own lane when a driver becomes unable to drive can be promptly avoided.

By contrast, when it can be recognized that traffic jam is solved on the traffic jam lane if own lane travelling is continued, the evacuation running assistance system 10b controls an own vehicle is controlled to continues the own lane driving to a point where the traffic jam is solved while considering (i.e., within) the time limit. Then, when the own vehicle arrives at the jam end point or in the vicinity thereof, it is determined if the own vehicle can be evacuated to the road shoulder of a road again. That is, since it is generally safer for an own vehicle to be evacuated to a road shoulder than to stop on a lane, a driver can safely wait for a rescue. In addition, by completing a rescue request during traveling on the own lane, the rescue can promptly reach the own vehicle. Hence, it is expected by the own vehicle to decrease a waiting time period for waiting for the rescue after reaching the traffic jam end point. In other words, it can be expected by the own vehicle to be safe at a stop while decreasing a rescue time period.

Figure 13:
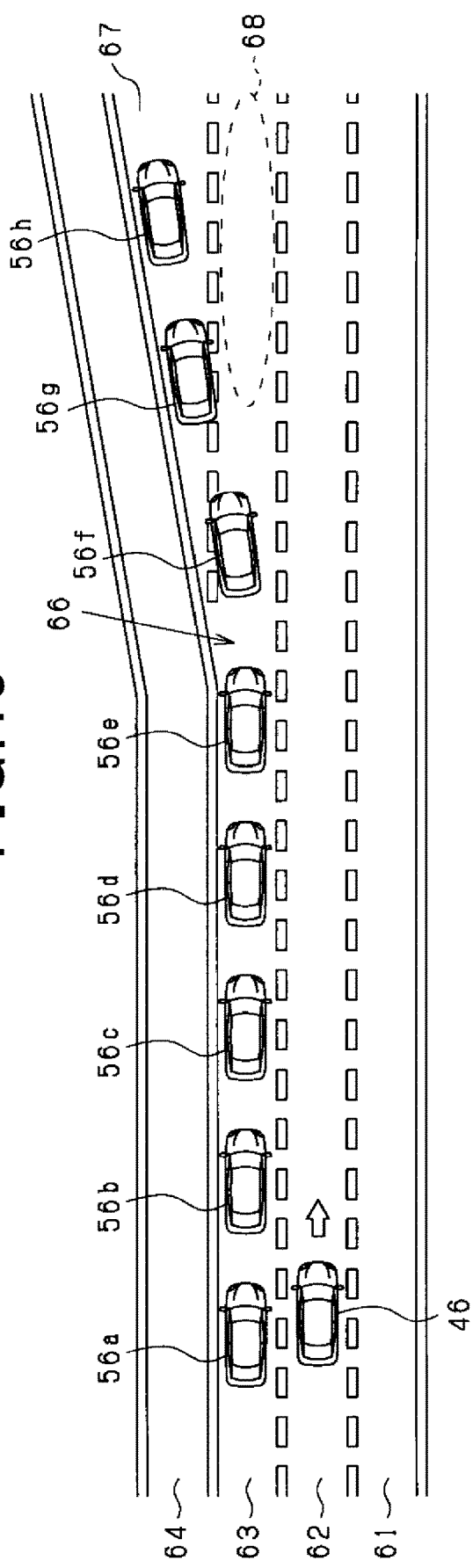
FIG. 13 is a diagram illustrating a situation where a bifurcation point is set for a traffic jam end point according to the third embodiment of the present disclosure.

Further, as illustrated in FIG. 13, the surrounding environment recognizer 11 may be configured to set a bifurcation point for a traffic jam end point when there is a bifurcation point 66 forward in a traffic jam lane. That is, when a lane 63 with a traffic jam branches off at the bifurcation point 66 and other vehicles 56a to 56h generating the traffic jam are forming a queue along a lane 67 beyond the bifurcation point 66 instead of the lane 63, a region of the lane 63 ahead of the bifurcation point 66 is free from the traffic jam forming a space 68 without a vehicle. Hence, if the space 68 is large enough for the own vehicle 46 to safely stop, the space 68 can be used as a place to stop the vehicle 46. Accordingly, the surrounding environment recognizer 11 sets the bifurcation point 66 for a traffic jam end point. Then, when it is expected that the own vehicle 46 can reach the traffic jam end point (i.e., the bifurcation point 66) within the time limit, the own vehicle situation determiner 16 may be configured to determine that the own vehicle 46 is in a situation to be controlled to continue evacuation running.

Further, when the bifurcation point 66 is present, the rescue requesting unit 20 may be configured to determine the space 68 as a vehicle stop expected section and notify the communication center 31 of such information. Hence, when compared to a situation in which a rescue request is made after stopping the own vehicle 46 in the space 68, it is expected by the own vehicle 46 to more effectively reduce a waiting time for waiting for a rescue.

FIG. 14 is a wide-area map acquired as map information illustrating a situation of the traffic jam illustrated in FIG. 13.

As illustrated in FIG. 14, in the wide-area map, a road 70, along which an own vehicle travels branches off into a first road 70*a* and a second road 70*b* at a bifurcation point 72. At an own vehicle position 71, which is a current position of the own vehicle 46, the bifurcation point 72 is set for the traffic jam end point with reference to the map information. As illustrated, the traffic jam segment 74 extends from the road 70 to a part of the road 70*a* beyond the bifurcation point 72. In such a situation, the rescue requesting unit 20 sets a segment indicated by a broken line in the drawing from the bifurcation point 72 to an arrival point 73 on the road 70*b* for a vehicle stop expected segment 75. Here, a point reached by the own vehicle when the time limit TL3 has elapsed after starting from an own vehicle position 71 can be set for the arrival point 73, for example.

The surrounding environment recognizer 11, the own vehicle situation determiner 16, and the rescue requesting unit 20 described in the third embodiment can be appropriately combined with any one of the first and second embodiments and are used.

According to each of the above-described embodiments, the following advantages can be obtained.

As described earlier, the evacuation running assistance system 10 includes the surrounding environment recognizer 11, the time limit setter 12, and (the lane change possibility determiner 13). The evacuation running assistance system 10 also includes the road shoulder evacuation possibility determiner 14, the road shoulder evacuation possibility road determiner 15, and the own vehicle situation determiner 16. The evacuation running assistance system 10 further includes the controller 17. Here, the surrounding environment recognizer 11 is enabled to recognize a presence of at least a space of a road shoulder and one or more other vehicles around an own vehicle. The time limit setter 12 sets a given time for a time limit within which an own vehicle is allowed to continue evacuation running. The road shoulder evacuation possibility determiner 14 determines if an own vehicle can be evacuated to the road shoulder in accordance with a space on the road shoulder recognized by the surrounding environment recognizer 11. That is, the road shoulder evacuation possibility determiner 14 determines if the own vehicle can be evacuated to the road shoulder. Further, the road shoulder evacuation possibility road determiner 15 acquires evacuation space information related to an evacuation space from a past running history of an own vehicle. The evacuation space information indicates a space on a road, to which evacuation of an own vehicle running on the road is allowed. With this, it is determined in accordance with the evacuation space information as to if the road on which the own vehicle travels is allowed to allow the own vehicle to be evacuated from the road to the road shoulder. The road shoulder evacuation possibility road determiner 15 further sets a given time less than the time limit for a provisional time in accordance with information of evacuation space acquired from the past running history of the own vehicle. The own vehicle situation determiner 16 determines (i.e., specifies) a current situation of the own vehicle in accordance with the time limit set by the time limit setter 12 and the road shoulder evacuation possibility determined by the road shoulder evacuation determiner 14. The own vehicle situation determiner 16 determines the current situation of the own vehicle by selecting one of situations where evacuation running is to be continued, on-lane stopping is to be performed, and evacuation to a road shoulder is performed. The own vehicle situation determiner 16 determines that the own vehicle is in a situation to be controlled to perform on-lane stopping when the road shoulder evacuation possibility road determiner 15 does not determine within the provisional time set by the road shoulder evacuation possibility road determiner 15 that the evacuation of the own vehicle to a road shoulder is possible. The controller 17 controls the own vehicle in accordance with the situation of the own vehicle determined by the own vehicle situation determiner 16.

Hence, according to the evacuation running assistance system 10, the own vehicle situation determiner 16 determines that the own vehicle is in a situation to be controlled to perform on-lane stopping when it is not determined within the provisional time that the evacuation of the own vehicle to a road shoulder is possible. Here, a given level is set for the provisional time by the road shoulder evacuation possibility road determiner 15 in accordance with the evacuation space information acquired from the past running history of the own vehicle. Hence, when the given time is set for the provisional time in accordance with the evacuation space information, the own vehicle situation determiner 16 can accordingly generate a result of determination within the provisional time that the own vehicle is in a situation to be controlled to perform on-lane stopping. As a result, the controller 17 can quickly control the own vehicle to perform the on-lane stopping without waiting for elapsing of the time limit, thereby avoiding a running time after a driver becomes unable to drive from being unnecessarily prolonged.

Further, the road shoulder evacuation possibility road determiner 15 may be configured to acquire either information indicating an emergency parking zone on a road where an own vehicle travels or information indicating a road shoulder allowing evacuation thereto as information of an evacuation space and set a given time for a provisional time in accordance with a presence or absence of evacuation space and a positional relation thereto.

Further, in the evacuation running assistance system 10, the past running history of the own vehicle may be configured to be initialized when at least one of conditions is met in that a given holding time has elapsed and a road on which an own vehicle travels has been changed.

Further, the own vehicle situation determiner 16 may be configured to refer to an on-lane stopping place list and determine that an own vehicle is in a situation to be controlled to stop at an on-lane stopping place included in the on-lane stopping place list, when the own vehicle can stop at the on-lane stopping place within the provisional time. Here, the on-lane stopping place list is a list prepared by listing on-lane stopping places as stoppable places on a lane where the own vehicle can stop within the lane of a road where the own vehicle travels. Hence, the own vehicle can be stopped quickly at the on-lane stopping place while avoiding a driving time period started after a driver becomes unable to drive the own vehicle from being unnecessarily prolonged.

Further, the evacuation running assistance system 10*b* includes the surrounding environment recognizer 11, the time limit setter 12, and the road shoulder evacuation possibility determiner 14. The evacuation running assistance system 10*b* also includes the own vehicle situation determiner 16 and the controller 17. Then, the own vehicle situation determiner 16 of the evacuation running assistance system 10*b* may be configured to determine before elapsing of the preset time limit that the own vehicle is in a situation to be controlled to perform on-lane stopping when the surrounding environment recognizer 11 determines that evacuation to a road shoulder is impossible due to a traffic jam. That is, the own vehicle situation determiner 16 can determine before the time limit that the own vehicle is in a situation to be controlled to perform on-lane stopping. As a result, the controller 17 can control the own vehicle to quickly perform on-lane stopping without waiting for elapsing of the time limit. Hence, a running time period after a driver becomes unable to drive can be effectively inhibited from being unnecessarily prolonged.

Further, like the evacuation running assistance system 10b, the surrounding environment recognizer 11 may be enabled to acquire traffic jam information in a distance by telecommunication. In addition, the own vehicle situation determiner 16 is configured to determine that an own vehicle is in a situation (to be controlled) to continue evacuation running when it is expected that the own vehicle can reach a place where the traffic jam is solved within the time limit set in advance by the time limit setter.

Further, like the evacuation running assistance system 10b, the surrounding environment recognizer 11 may be configured to identify a traffic jam lane as a lane with a traffic jam based on map information and set a bifurcation point as a traffic jam end point when a bifurcation point is present forward on the traffic jam lane. In such a situation, the own vehicle situation determiner 16 may be configured to determine an own vehicle as being in a situation to be controlled to continue evacuation running if it is expected that the own vehicle can reach the traffic jam end point within the time limit set in advance by the time limit setting unit.

Further, Like the evacuation running assistance system 10b, the rescue requesting unit 20 may be further provided to request a rescue to an external communication center therefrom by telecommunication. The rescue requesting unit 20 may be configured to set a stop expected segment between a traffic jam end point and a point reached by an own vehicle in the time limit, and notify the external communication center of the stop expected segment.

Further, like the evacuation running assistance system 10a, the evacuation resumption possibility determiner 19 is further provided to determine if the 0vehicle can resume evacuation running based on a given condition after on-lane stopping is performed. Hence, the controller 17 may be configured to control the own vehicle to resume evacuation to a road shoulder when the evacuation resumption possibility determiner determines that the own vehicle is in a situation to be able to resume the evacuation running within the time limit after determining that the own vehicle is in a situation to be controlled to perform on-lane stopping.

Further, the evacuation resumption possibility determiner 19 may be configured to determine if evacuation running of the own vehicle is resumed based on a result of such a determination received from either the communication facility or the portable device via an interface. Otherwise, the evacuation resumption possibility determiner 19 may be configured to determine if evacuation running of the own vehicle is resumed based on a result of such a determination made by the in-vehicle calculator.

Further, the evacuation resumption possibility determiner can be configured to determine if an own vehicle can resume evacuation running in accordance with a legal speed assigned to a road where the own vehicle is stopped or a vehicle speed of a rear side vehicle running beside the own vehicle and a distance to the rear side vehicle.

Further, the evacuation resumption possibility determiner can be configured to determine that it is possible to resume evacuation running of an own vehicle regardless of the time limit when the own vehicle completes evacuation to a road shoulder and a passenger gets off the own vehicle.

Further, when the controller resumes evacuation of an own vehicle to a road shoulder, a communication facility remotely controls the controller to control the own vehicle.

Here, the controller and the method using the controller described in the present disclosure may be implemented by a dedicated computer constituted by a processor programmed to perform one or more functions embodied by computer program and a memory. Alternatively, the controller and the method using the controller described in the present disclosure may be implemented by a dedicated computer constituted by a processor including one or more dedicated hardware logic circuits. Alternatively, the controller and the method using the controller described in the present disclosure may be achieved by one or more dedicated computers composed of a processor programmed to perform one or more functions and a processor composed of a memory and one or more hardware logic circuits. Further, the computer program as instructions executed by a computer may be stored in a computer-readable non-transitory tangible recording medium.

Numerous additional modifications and variations of the present disclosure are possible in light of the above teachings. It is hence to be understood that within the scope of the appended claims, the present disclosure may be performed otherwise than as specifically described herein. For example, the present disclosure is not limited to the above-described evacuation running assistance system and may be altered as appropriate.

What is claimed is:

1. An evacuation running assistance system comprising:
a surrounding environment recognizer enabled to recognize at least a space on a road shoulder and existence of one or more vehicles around an own vehicle;
an evacuation running time limit setter to set a first given time period for a time limit in which the own vehicle is allowed to continue evacuation running, the first given time period being an upper time limit for the own vehicle to be able to continue evacuation running to an evacuation location in which the evacuation running is initiated in response to a determination that a driver of the own vehicle is unable to operate the own vehicle;
a road shoulder evacuation possibility determiner to determine whether the own vehicle can be evacuated to a road shoulder in accordance with the space of the road shoulder recognized by the surrounding environment recognizer;
an own vehicle situation determiner to determine a current situation of the own vehicle in accordance with the time limit set by the evacuation running time limit setter and a determination result of determining whether the own vehicle can be evacuated to a road shoulder by the road shoulder evacuation possibility determiner, the own vehicle situation determiner determining the current situation by selecting, as the current situation, a control situation from a plurality of control situations that includes:
(i) a continuing evacuation running situation,
(ii) an on-lane stopping situation, and
(iii) an evacuation to a road shoulder situation,
a controller to control the own vehicle in accordance with the current situation of the own vehicle determined by the own vehicle situation determiner; and
a road shoulder evacuation possibility road determiner to, in response to the own vehicle situation determiner determining that the current situation is (i) the continuing evacuation running situation or (iii) the evacuation to a road shoulder situation:

acquire evacuation space information from a past running history of the own vehicle corresponding to previous trips of the own vehicle along the road, the evacuation space information indicating a space on a road shoulder of a road, the space allowing evacuation of the own vehicle that travels along the road, determine whether the road allows road shoulder evacuation of the own vehicle traveling along the road based on the evacuation space information, set a second given time period for a provisional time shorter than the first given time period in which the second given time period is set in accordance with a result of the determination as to whether the road allows road shoulder evacuation that is made based on the evacuation space information as determined based on the past running history of the own vehicle, and wherein the own vehicle situation determiner determines that the current situation is the on-lane stopping situation when the road shoulder evacuation possibility road determiner does not determine within the provisional time that the evacuation of the own vehicle to the road shoulder is possible.

2. The evacuation running assistance system as claimed in claim 1, wherein:

the road shoulder evacuation possibility road determiner acquires, as the evacuation space information, either information on an emergency parking zone located on a road where the own vehicle travels or information on the road shoulder corresponding to the amount of space of the road shoulder that allows evacuation of the own vehicle, the road shoulder evacuation possibility road determiner sets the second given time period for the provisional time in accordance with a presence or an absence of an evacuation space allowing evacuation of the own vehicle indicated by the evacuation space information, and the road shoulder evacuation possibility road determiner sets the second given time period for the provisional time in accordance with a positional relationship between successive evacuation spaces indicated by the evacuation space information when the evacuation space allowing evacuation of the own vehicle indicated by the evacuation space information is present.

3. The evacuation running assistance system as claimed in claim 1, wherein the past running history of the own vehicle is initialized by either an event of elapse of a given information holding time period or an event of a change in road traveled by the own vehicle.

4. The evacuation running assistance system as claimed in claim 1, wherein the own vehicle situation determiner refers to an on-lane stopping place list listing on-lane stopping places allowing the own vehicle to stop on a lane of the road on which the own vehicle travels, the own vehicle situation determiner determining that the own vehicle is in a situation where the own vehicle is to be stopped at the on-lane stopping place in response to a determination made within the provisional time period that the own vehicle can stop at one of the on-lane stopping places included in the on-lane stopping place list.

5. The evacuation running assistance system as claimed in claim 1, further comprising an evacuation resumption possibility determiner to determine, after the on-lane stopping has been performed, whether evacuation running of the own vehicle can be resumed based on a given condition, wherein the controller controls the own vehicle to resume evacuation running when the evacuation resumption possibility determiner determines within the given time limit that the own vehicle can resume evacuation running after the own vehicle situation determiner has determined that the current situation of the own vehicle is the on-lane stopping situation.

6. An evacuation running assistance system comprising:

a surrounding environment recognizer enabled to recognize at least a space on a road shoulder and existence of one or more vehicles around an own vehicle;

a time limit setter to set a given time period for a time limit allowing the own vehicle to continue evacuation running, the given time period being an upper time limit for the own vehicle to be able to continue evacuation running to an evacuation location in which the evacuation running is initiated in response to a determination that a driver of the own vehicle is unable to operate the own vehicle;

a road shoulder evacuation possibility determiner to determine whether the own vehicle can be evacuated to the road shoulder in accordance with the space of the road shoulder recognized by the surrounding environment recognizer;

an own vehicle situation determiner to determine a current situation of the own vehicle in accordance with the given time period as set and the road shoulder evacuation possibility as determined, the own vehicle situation determiner determining the current situation by selecting, as the current situation, a control situation from a plurality of control situations that includes:

a continuing evacuation running situation, an on-lane stopping situation, and an evacuation to a road shoulder situation, wherein the own vehicle situation determiner determines before the given time period has elapsed that the current situation of the own vehicle is the on-lane stopping situation when it is determined by the surrounding environment recognizer that it is impossible to evacuate to the road shoulder due to a traffic jam as indicated by the presence of a certain number of multiple other vehicles in a lane between a lane of the own vehicle and the road shoulder; and a controller to control the own vehicle in accordance with the current situation of the own vehicle determined by the own vehicle situation determiner.

7. The evacuation running assistance system as claimed in claim 6, wherein the surrounding environment recognizer is enabled to acquire information of a place where the traffic jam has been solved in a distance by telecommunication, wherein the own vehicle situation determiner determines that the current situation of the own vehicle is the continuing evacuation running situation when it is expected that the own vehicle can reach the place where the traffic jam has been solved within the time limit set in advance by the time limit setter.

8. The evacuation running assistance system as claimed in claim 6, wherein the surrounding environment recognizer identifies a traffic jam lane based on map information, and sets a bifurcation point for a traffic jam end point when there is the bifurcation point forward in the traffic jam lane, wherein the own vehicle situation determiner determines that the current situation of the own vehicle is the continuing evacuation running situation when the own vehicle is expected to be able to reach the traffic jam end point within the given time period set in advance by the time limit setter.

9. The evacuation running assistance system as claimed in claim 8, further comprising a rescue requesting unit that requests a rescue to an external communication center by telecommunication, wherein the rescue requesting unit sets a given section for a stop expected section between the traffic jam end point and a point that can be reached by the own vehicle in the given time period, the rescue requesting unit notifying the external communication center of the stop expected section at which the own vehicle is stopped.

10. An evacuation running assistance system comprising:
a surrounding environment recognizer enabled to recognize at least a space on a road shoulder and existence of one or more vehicles around an own vehicle;
a time limit setter to set a given time period for a time limit allowing the own vehicle to continue evacuation running, the given time period being an upper time limit for the own vehicle to be able to continue evacuation running to an evacuation location in which the evacuation running is initiated in response to a determination that a driver of the own vehicle is unable to operate the own vehicle;
a road shoulder evacuation possibility determiner to determine whether the own vehicle can be evacuated to the road shoulder in accordance with the space of the road shoulder recognized by the surrounding environment recognizer;
an own vehicle situation determiner to determine a current situation of the own vehicle in accordance with the given time period as set and the road shoulder evacuation possibility as determined, the own vehicle situation determiner determining the current situation by selecting, as the current situation, a control situation from a plurality of control situations that includes:
a continuing evacuation running situation,
an on-lane stopping situation, and
an evacuation to a road shoulder situation,
an evacuation resumption possibility determiner to determine whether evacuation running of the own vehicle can be resumed in accordance with a given condition after on-lane stopping has been performed in accordance with a previous determination that a previous current situation was the on-lane stopping situation; and
a controller to control own vehicle in accordance with the current situation of the own vehicle determined by the own vehicle situation determiner,
wherein the controller controls the own vehicle to resume evacuation running in response to a determination that the own vehicle can resume evacuation running by the evacuation resumption possibility determiner that is made within the given time period after the own vehicle situation determiner has determined that the current situation of the own vehicle is the on-lane stopping situation.

11. The evacuation running assistance system as claimed in claim 10, wherein the evacuation resumption possibility determiner is configured to determine whether the evacuation running of the own vehicle is to be resumed based on a determination received from a communication facility as to whether evacuation running of the own vehicle is to resumed, a determination of a passenger acquired via an interface or a portable device as to whether evacuation running of the own vehicle is resumed, or a determination of in-vehicle software as to whether evacuation running of the own vehicle is resumed.

12. The evacuation running assistance system as claimed in claim 10, wherein the evacuation resumption possibility determiner is configured to determine in accordance with a legal speed assigned to a road where the own vehicle is stopped or a vehicle speed of a rear side vehicle running beside the own vehicle, and a distance to the rear side vehicle, whether the own vehicle can resume evacuation running.

13. The evacuation running assistance system as claimed in claim 10, wherein the evacuation resumption possibility determiner is configured to determine that it is possible to resume evacuation running of the own vehicle regardless of the given time period when the own vehicle completes evacuation to the road shoulder and a passenger gets off the own vehicle.

14. The evacuation running assistance system as claimed in claim 10, wherein the controller controls the own vehicle based on remote operations from an external communication center in response to resuming road shoulder evacuation running.

* * * * *